US012615128B2

(12) United States Patent
Zhang et al.

(10) Patent No.:  US 12,615,128 B2
(45) Date of Patent:      Apr. 28, 2026

(54) SWITCHING BETWEEN SUBBAND FULL DUPLEX AND HALF DUPLEX MODES FOR DIFFERENT PERIODICITIES

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 17/933,839

(22) Filed: Sep. 20, 2022

(65) Prior Publication Data

US 2024/0097867 A1      Mar. 21, 2024

(51) Int. Cl.
*H04L 5/00* (2006.01)
*H04L 5/14* (2006.01)
*H04W 72/044* (2023.01)

(52) U.S. Cl.
CPC .............. *H04L 5/0096* (2013.01); *H04L 5/14* (2013.01); *H04W 72/044* (2013.01); *H04L 5/0005* (2013.01)

(58) Field of Classification Search
CPC ....... H04L 5/0096; H04L 5/14; H04L 5/0005; H04L 5/001; H04L 5/1469; H04L 5/0053; H04L 5/0058; H04L 5/0094; H04L 5/16; H04W 72/044
See application file for complete search history.

(56) References Cited

U.S. PATENT DOCUMENTS

2021/0400654 A1*  12/2021  Ibrahim ................ H04W 72/20
2024/0057050 A1*   2/2024  Zhang ........................ H04L 5/14

FOREIGN PATENT DOCUMENTS

WO        2022183914 A1      9/2022

OTHER PUBLICATIONS

3GPP TSG RAN WG1, Meeting #110, R1-2207231, Aug. 22-26, 2022, Qualcomm Incorporated, Feasibility and techniques for subband non-overlapping full duplex (Year: 2022).*

(Continued)

*Primary Examiner* — Charles C Jiang
*Assistant Examiner* — Rachel Elizabeth Marks
(74) *Attorney, Agent, or Firm* — Procopio, Cory, Hargreaves & Savitch LLP

(57)        ABSTRACT

Apparatuses and methods for switching between SBFD and HD modes for different periodicities are described. An apparatus is configured to operate in a SBFD mode associated with a SBFD operation or a HD mode. SBFD operations are associated with SB sets and the HD mode is associated with time/frequency resource sets. The apparatus is configured to obtain first indications of a time/frequency location for each SB, or second indications of the time/frequency resources, and switch to operate in another of the SBFD or the HD mode based on the first or second indications. Another apparatus is configured to configure time/frequency locations for SBs of SBFD operations associated with SBFD modes and time/frequency resources of a HD mode, and transmit, for a UE, first indications of the time/frequency locations, or second indications of the time/frequency resources.

30 Claims, 15 Drawing Sheets

(56) References Cited

OTHER PUBLICATIONS

CEWIT: "Discussion on Subband Non-overlapping Full Duplex", 3GPP TSG RAN WGI Meeting #110, R1-2207069, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 5 Pages, XP052275007, Sections 1-5, p. 1-p. 3.
International Search Report and Written Opinion—PCT/US2023/030825—ISA/EPO—Dec. 4, 2023.
Qualcomm Incorporated: "Feasibility and Techniques for Subband Non-Overlapping Full Duplex", 3GPP TSG RAN WG1, Meeting #110, R1-2207231, 3rd Generation Partnership Project, Mobile Competence Centre, 650, Route Des Lucioles, F-06921 Sophia-Antipolis Cedex, France, vol. RAN WG1, No. Toulouse, Aug. 22, 2022-Aug. 26, 2022, Aug. 13, 2022, pp. 1-28, XP052275167, Sections 1-5, pp. 7, Para 2.5.2, pp. 9, Section 3.1.2, Fig 3-2, pp. 8, pp. 11.

* cited by examiner

Figure 5:
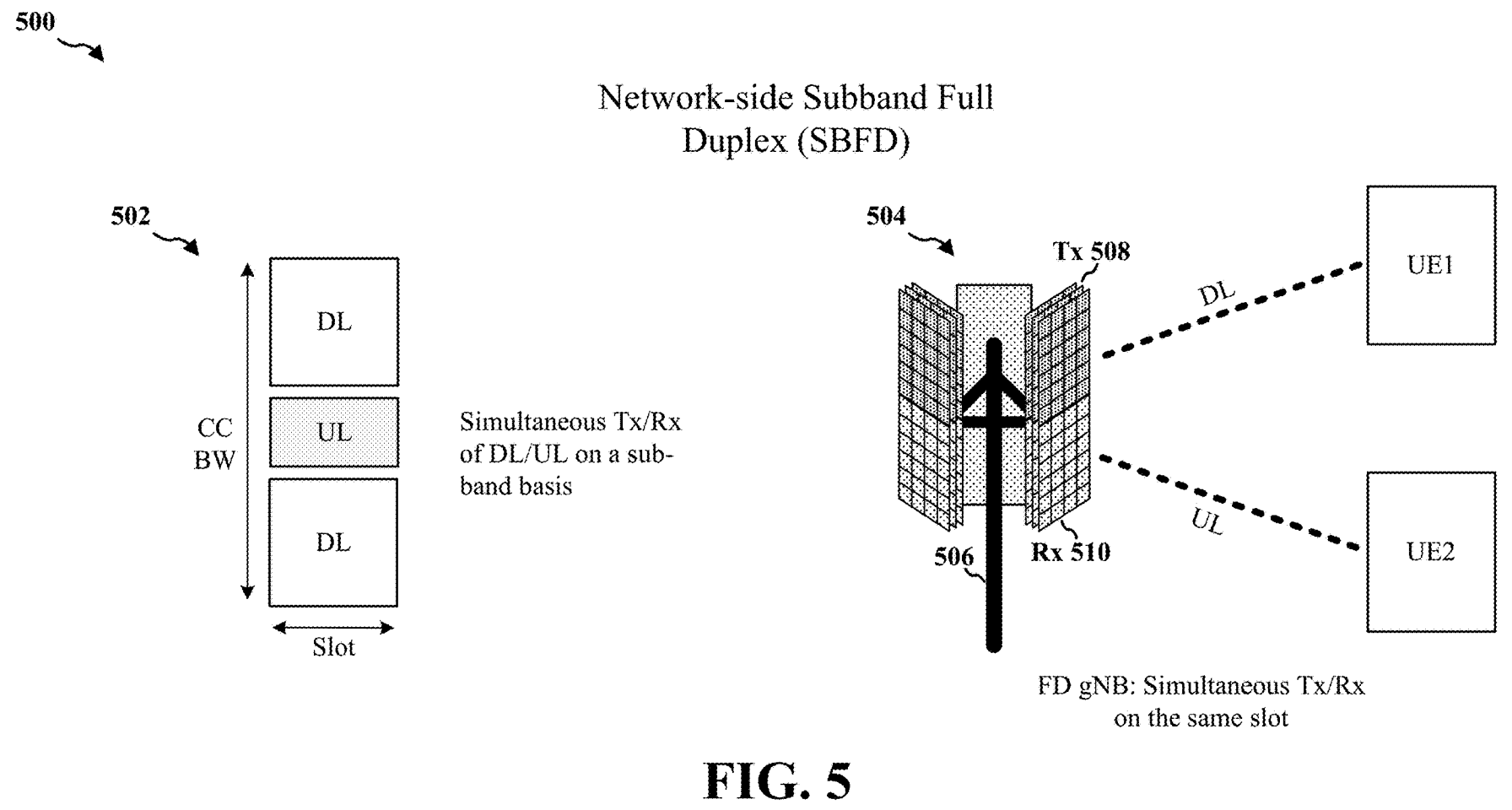

Network-side Subband Full
Duplex (SBFD)

Tx 508

Rx 510

504

506

UE1

UE2

DL

UL

FD gNB: Simultaneous Tx/Rx
on the same slot

Simultaneous Tx/Rx
of DL/UL on a sub-
band basis

DL

UL

DL

CC
BW

Slot

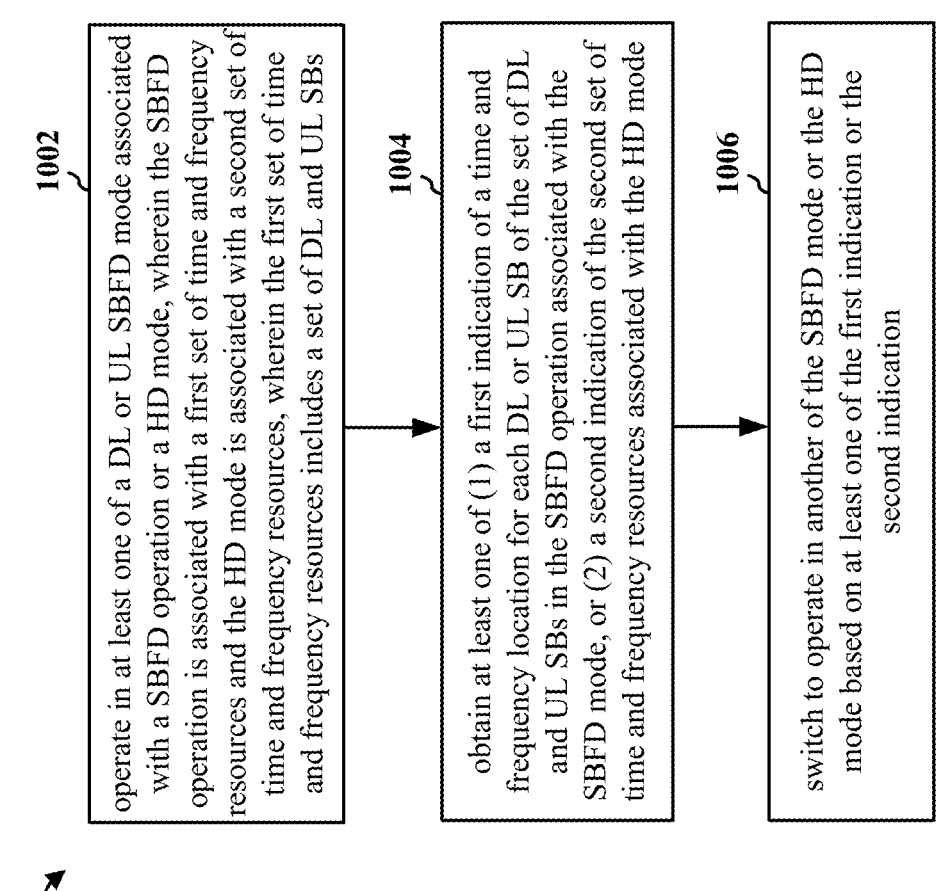

1002 operate in at least one of a DL or UL SBFD mode associated with a SBFD operation or a HD mode, wherein the SBFD operation is associated with a first set of time and frequency resources and the HD mode is associated with a second set of time and frequency resources, wherein the first set of time and frequency resources includes a set of DL and UL SBs

1004 obtain at least one of (1) a first indication of a time and frequency location for each DL or UL SB of the set of DL and UL SBs in the SBFD operation associated with the SBFD mode, or (2) a second indication of the second set of time and frequency resources associated with the HD mode

1006 switch to operate in another of the SBFD mode or the HD mode based on at least one of the first indication or the second indication

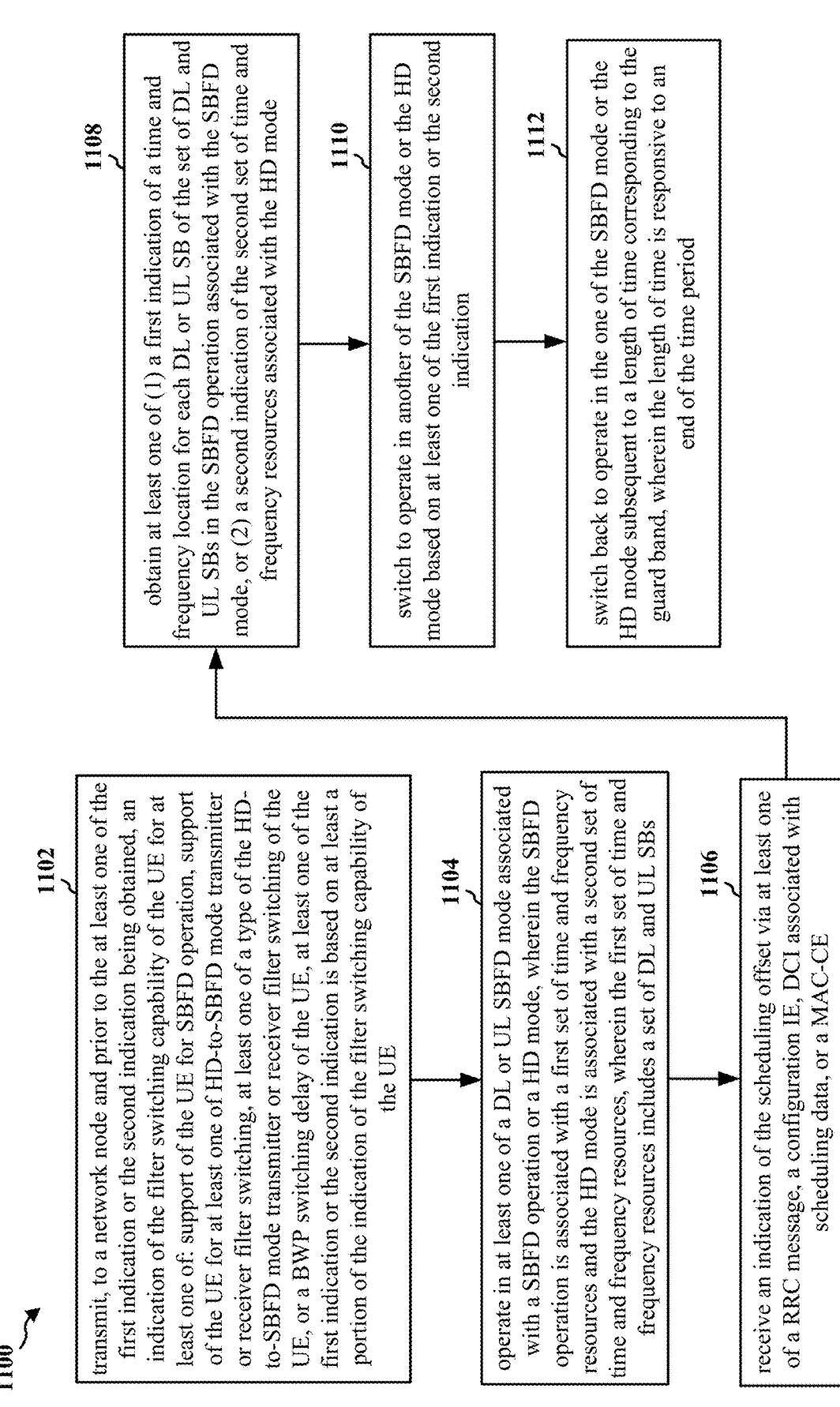

1102 — transmit, to a network node and prior to the at least one of the first indication or the second indication being obtained, an indication of the filter switching capability of the UE for at least one of: support of the UE for SBFD operation, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE 1104 — operate in at least one of a DL or UL SBFD mode associated with a SBFD operation or a HD mode, wherein the SBFD operation is associated with a first set of time and frequency resources and the HD mode is associated with a second set of time and frequency resources, wherein the first set of time and frequency resources includes a set of DL and UL SBs 1106 — receive an indication of the scheduling offset via at least one of a RRC message, a configuration IE, DCI associated with scheduling data, or a MAC-CE 1108 — obtain at least one of (1) a first indication of a time and frequency location for each DL or UL SB of the set of DL and UL SBs in the SBFD operation associated with the SBFD mode, or (2) a second indication of the second set of time and frequency resources associated with the HD mode 1110 — switch to operate in another of the SBFD mode or the HD mode based on at least one of the first indication or the second indication 1112 — switch back to operate in the one of the SBFD mode or the HD mode subsequent to a length of time corresponding to the guard band, wherein the length of time is responsive to an end of the time period

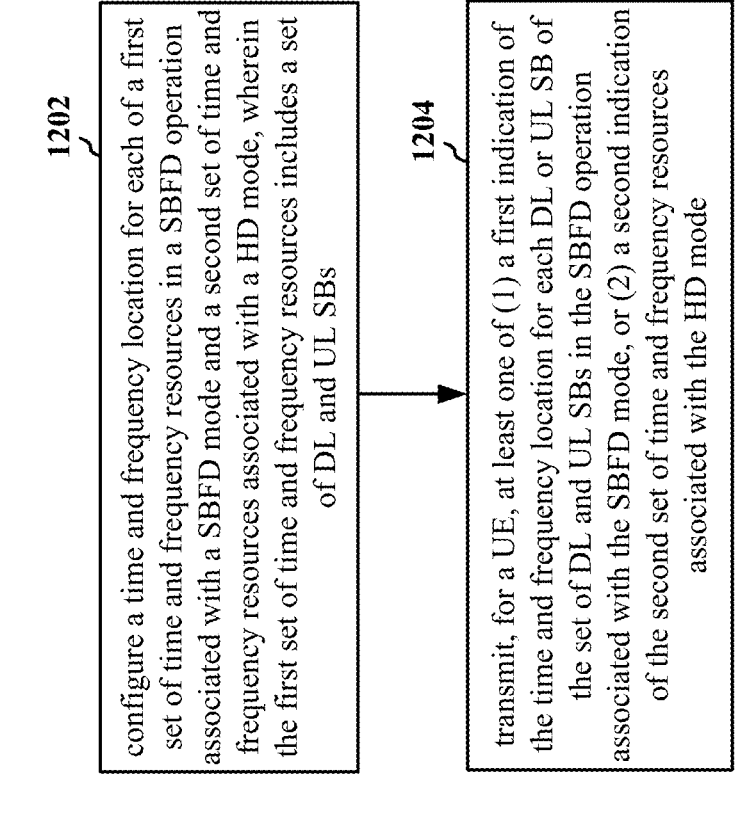

1202 configure a time and frequency location for each of a first set of time and frequency resources in a SBFD operation associated with a SBFD mode and a second set of time and frequency resources associated with a HD mode, wherein the first set of time and frequency resources includes a set of DL and UL SBs

1204 transmit, for a UE, at least one of (1) a first indication of the time and frequency location for each DL or UL SB of the set of DL and UL SBs in the SBFD operation associated with the SBFD mode, or (2) a second indication of the second set of time and frequency resources associated with the HD mode

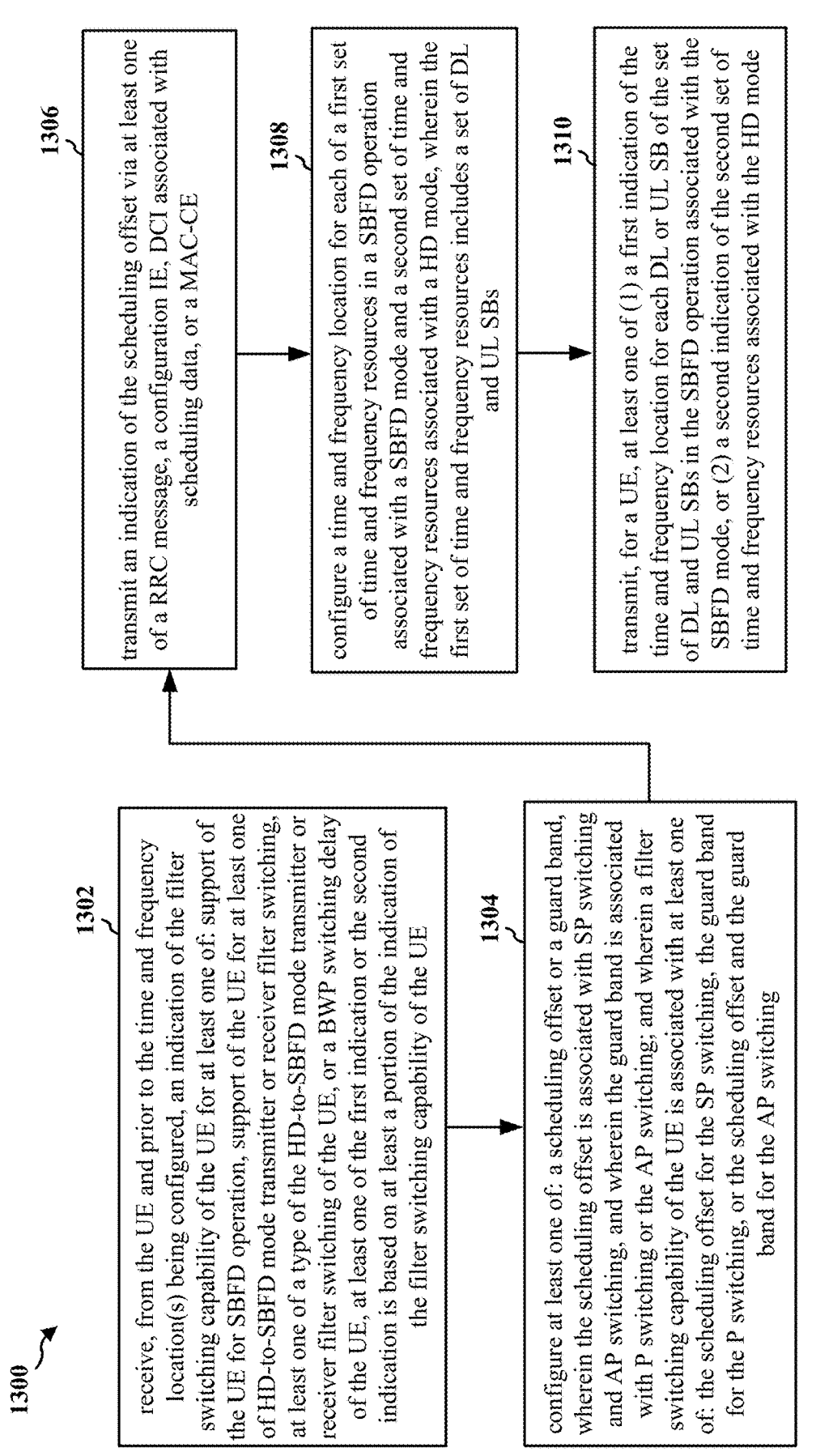

1300

1302 receive, from the UE and prior to the time and frequency location(s) being configured, an indication of the filter switching capability of the UE for at least one of: support of the UE for SBFD operation, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE

1304 configure at least one of: a scheduling offset or a guard band, wherein the scheduling offset is associated with SP switching and AP switching, and wherein the guard band is associated with P switching or the AP switching; and wherein a filter switching capability of the UE is associated with at least one of: the scheduling offset for the SP switching, the guard band for the P switching, or the scheduling offset and the guard band for the AP switching

1306 transmit an indication of the scheduling offset via at least one of a RRC message, a configuration IE, DCI associated with scheduling data, or a MAC-CE

1308 configure a time and frequency location for each of a first set of time and frequency resources in a SBFD operation associated with a SBFD mode and a second set of time and frequency resources associated with a HD mode, wherein the first set of time and frequency resources includes a set of DL and UL SBs

1310 transmit, for a UE, at least one of (1) a first indication of the time and frequency location for each of DL or UL SB of the set of DL and UL SBs in the SBFD operation associated with the SBFD mode, or (2) a second indication of the second set of time and frequency resources associated with the HD mode

FIG. 13

SWITCHING BETWEEN SUBBAND FULL DUPLEX AND HALF DUPLEX MODES FOR DIFFERENT PERIODICITIES

TECHNICAL FIELD

The present disclosure relates generally to communication systems, and more particularly, to wireless communications utilizing subband full duplex and half duplex operational modes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus is configured to operate in at least one of a downlink (DL) or uplink (UL) subband (SB) full duplex (SBFD) mode associated with a SBFD operation or a half-duplex (HD) mode, where the SBFD operation is associated with a first set of time and frequency resources and the HD mode is associated with a second set of time and frequency resources, and where the first set of time and frequency resources includes a set of DL and UL SBs. The apparatus is further configured obtain at least one of (1) a first indication of a time and frequency location for each DL or UL SB of the set of DL and UL SBs in the SBFD operation associated with the SBFD mode, or (2) a second indication of the second set of time and frequency resources associated with the HD mode. In addition, the apparatus is further configured to switch to operate in another of the SBFD mode or the HD mode based on at least one of the first indication or the second indication.

In the aspect, the method includes operating in at least one of a downlink (DL) or uplink (UL) subband (SB) full duplex (SBFD) mode associated with a SBFD operation or a half-duplex (HD) mode, where the SBFD operation is associated with a first set of time and frequency resources and the HD mode is associated with a second set of time and frequency resources, and where the first set of time and frequency resources includes a set of DL and UL SBs. The method also includes obtaining at least one of (1) a first indication of a time and frequency location for each DL or UL SB of the set of DL and UL SBs in the SBFD operation associated with the SBFD mode, or (2) a second indication of the second set of time and frequency resources associated with the HD mode. In addition, the method also includes switching to operate in another of the SBFD mode or the HD mode based on at least one of the first indication or the second indication.

In another aspect of the disclosure, a method, a computer-readable medium, and an apparatus are provided for wireless communication at a network node. The apparatus is configured to configure a time and frequency location for each of a first set of time and frequency resources in a subband (SB) full duplex (SBFD) operation associated with a SBFD mode and a second set of time and frequency resources associated with a half-duplex (HD) mode, where the first set of time and frequency resources includes a set of downlink (DL) and uplink (UL) SBs. In addition, the apparatus is configured to transmit, for a user equipment (UE), at least one of (1) a first indication of the time and frequency location for each DL or UL SB of the set of DL and UL SBs in the SBFD operation associated with the SBFD mode, or (2) a second indication of the second set of time and frequency resources associated with the HD mode.

In the aspect, the method includes configuring a time and frequency location for each of a first set of time and frequency resources in a subband (SB) full duplex (SBFD) operation associated with a SBFD mode and a second set of time and frequency resources associated with a half-duplex (HD) mode, where the first set of time and frequency resources includes a set of downlink (DL) and uplink (UL) SBs. In addition, the method includes transmitting, for a user equipment (UE), at least one of (1) a first indication of the time and frequency location for each DL or UL SB of the set of DL and UL SBs in the SBFD operation associated with the SBFD mode, or (2) a second indication of the second set of time and frequency resources associated with the HD mode.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of a subband (SB) FD (SBFD) configuration at a network node, in accordance with various aspects of the present disclosure.

FIG. 10 is a flowchart of a method of wireless communication, in accordance with various aspects of the present disclosure.

FIG. 11 is a flowchart of a method of wireless communication, in accordance with various aspects of the present disclosure.

FIG. 12 is a flowchart of a method of wireless communication, in accordance with various aspects of the present disclosure.

FIG. 13 is a flowchart of a method of wireless communication, in accordance with various aspects of the present disclosure.

DETAILED DESCRIPTION

Figure 1:
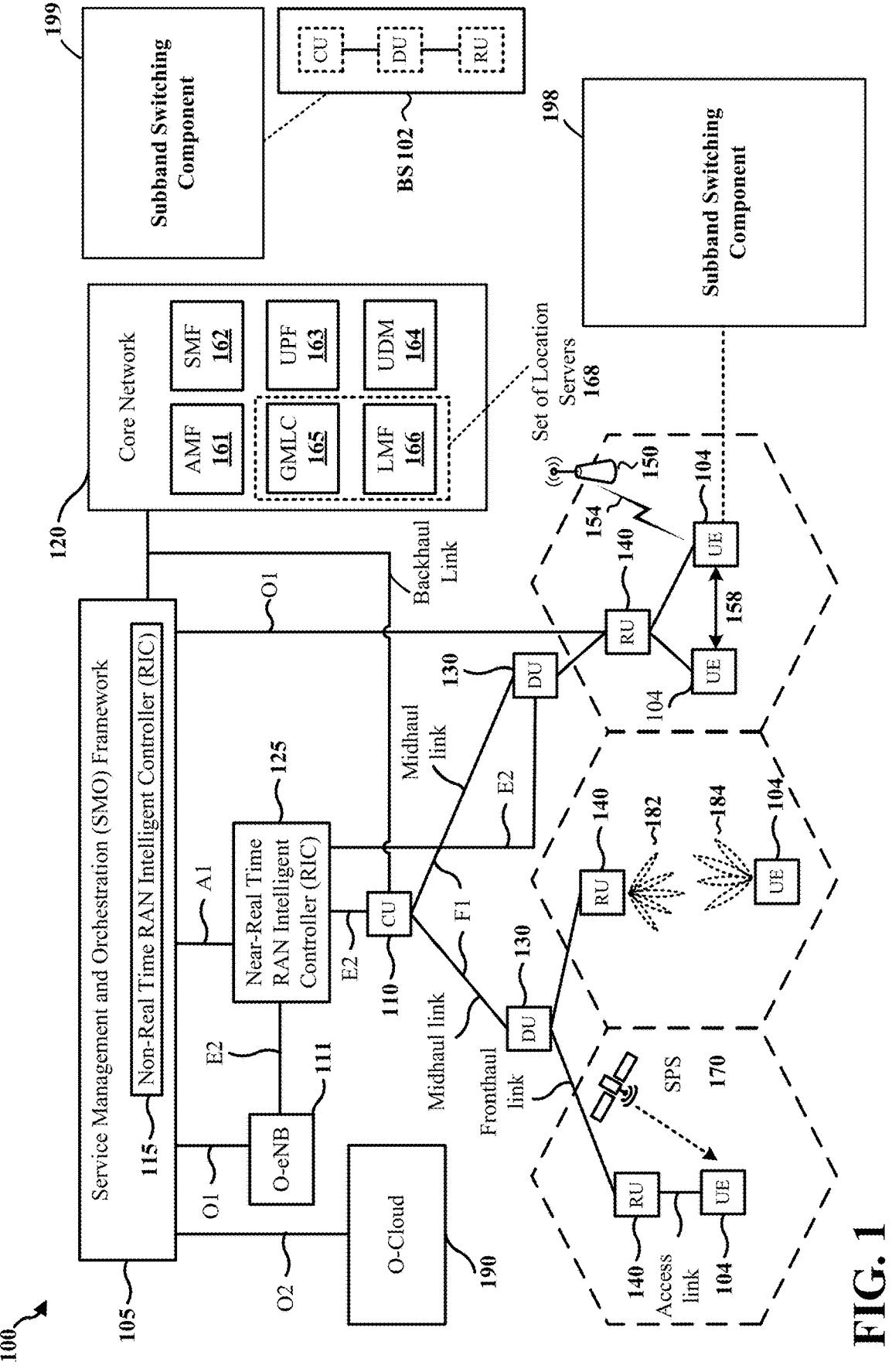
FIG. 1 is a diagram illustrating an example of a wireless communications system and an access network.

Various aspects herein relate to switching between subband (SB) full duplex (FD) (SBFD) and half duplex (HD) modes for different switching periodicities. 5G NR is designed to provide network side duplexing through base stations, gNBs, etc., but does not include provisions to enable a HD user equipment (UE) to utilize FD at a SB level. Additionally, network-side FD suffers from self-interference, as well as clutter from signal reflection which impairs signals in communications. Thus, network-side FD is underutilized at both the network- and UE-sides of communications. The described aspects provide for the ability to switch an apparatus, e.g., a UE, for operation between an SBFD mode or a HD mode based on obtained indications of time and frequency locations of SBs in SBFD operations and of time and frequency resources associated with the HD mode.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a subband switching component 198 ("component 198") that is configured to operate in at least one of a downlink (DL) or uplink (UL) subband (SB) full duplex (SBFD) mode associated with a SBFD operation or a half-duplex (HD) mode, where the SBFD operation is associated with a first set of time and frequency resources and the HD mode is associated with a second set of time and frequency resources, where the first set of time and frequency resources includes a set of DL and UL SBs. The component 198 is also configured to obtain at least one of (1) a first indication of a time and frequency location for each DL or UL SB of the set of DL and UL SBs in the SBFD operation associated with the SBFD mode, or (2) a second indication of the second set of time and frequency resources associated with the HD mode. In addition, the component 198 is configured to switch to operate in another of the SBFD mode or the HD mode based on at least one of the first indication or the second indication. In some aspects, where a time period of the SBFD mode or the HD mode for aperiodic switching includes a number of symbols or a duration of time, component 198 may be configured to wait, for a length of time corresponding to a guard band, responsive to an end of a time period, and to switch back to operate in the one of the SBFD mode or the HD mode subsequent to the wait.

In certain aspects, the base station 102 may include a subband switching component 199 ("component 199") that is configured to configure a time and frequency location for each SB of a set of DL and UL SBs in a SBFD operation associated with a SBFD mode and a set of time and frequency resources associated with a half-duplex (HD) mode, and to transmit, for a UE, at least one of (1) a first indication of the time and frequency location for each SB of the set of DL and UL SBs in the SBFD operation associated with the SBFD mode, or (2) a second indication of the set of time and frequency resources associated with the HD mode. In some aspects, the component 199 may be configured to configure at least one of a scheduling offset for semi-persistent switching, a guard band for periodic switching, or a scheduling offset and a guard band for aperiodic switching. Although the following description may be focused on 5G NR, the concepts described herein may be applicable to other similar areas, such as LTE, LTE-A, CDMA, GSM, and other wireless technologies.

Figures 2A, 2B, 2C, 2D:
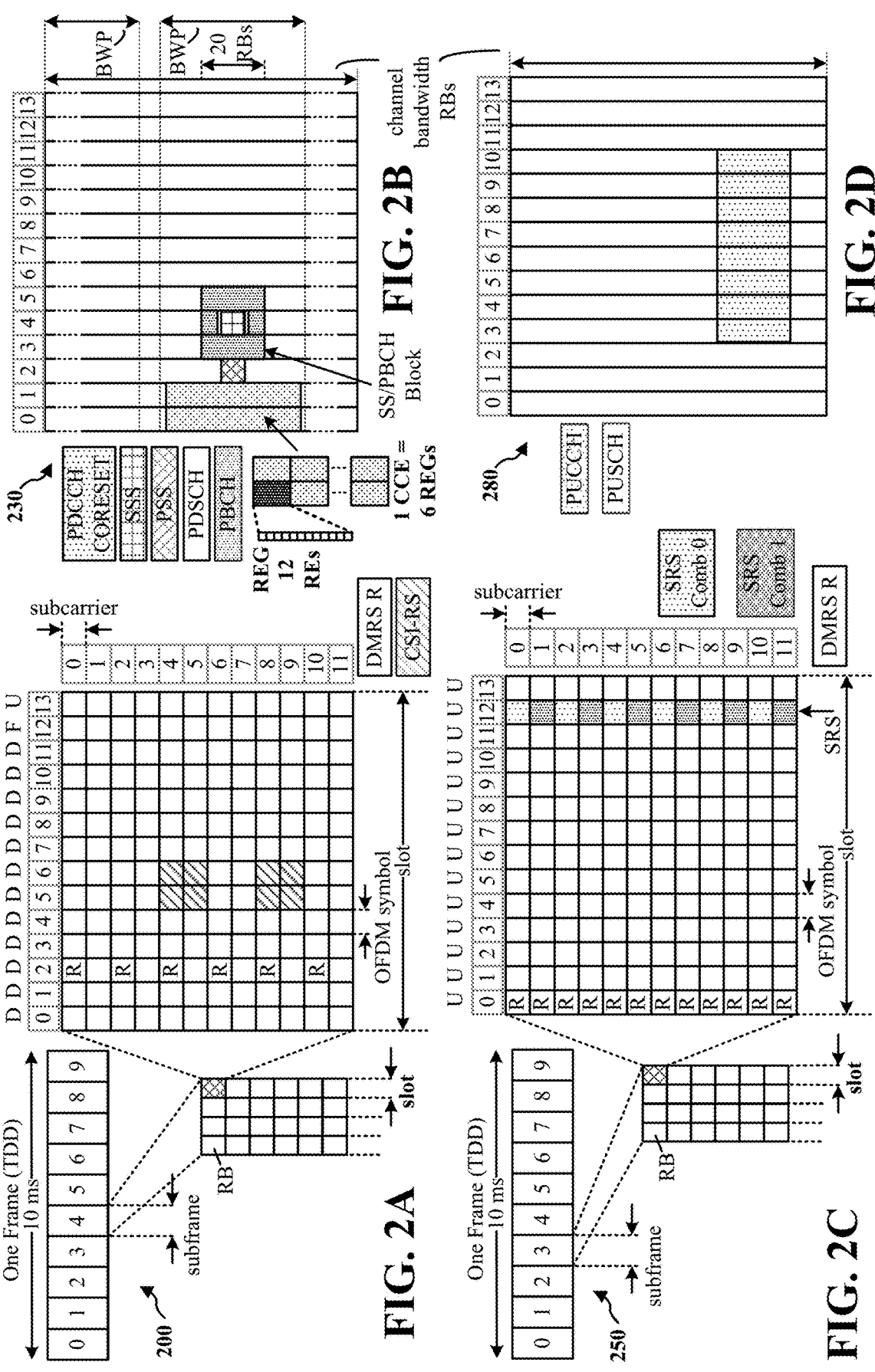
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^{\mu}$ slots/subframe. The subcarrier spacing may be equal to $2^{\mu}$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
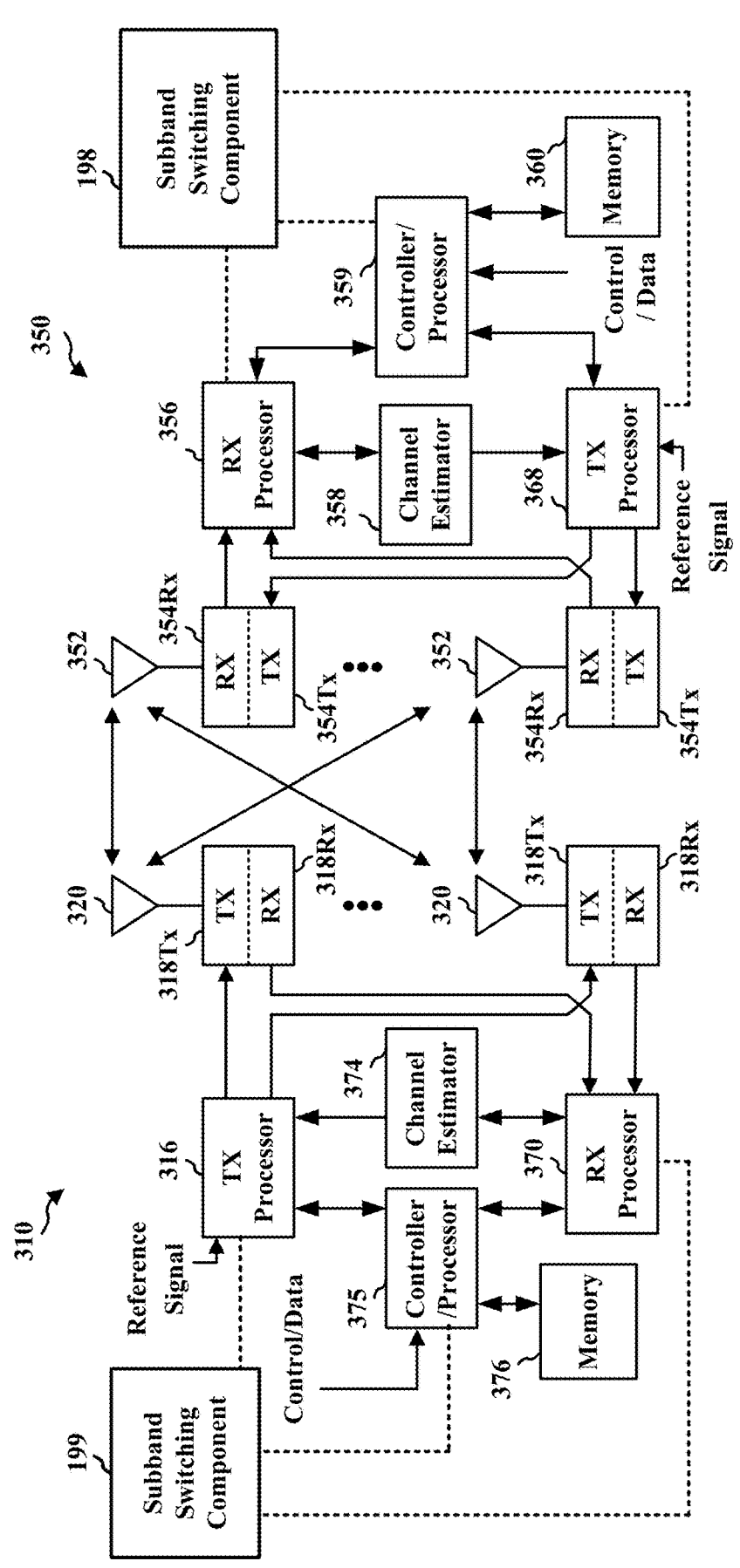
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the subband switching component 198 of FIG. 1. At least one of the TX processor 316, the RX processor 370, and the controller/processor 375 may be configured to perform aspects in connection with the subband switching component 199 of FIG. 1.

Some types of wireless communications (e.g., 5G NR) may be designed to provide network side duplexing through base stations, gNBs, etc., but may not include provisions to enable a HD UE to utilize FD at a SB level. Relatedly, network-side FD may suffer from self-interference, as well as clutter from signal reflection which impairs signals in communications. Thus, network-side FD may be underutilized at both the network- and UE-sides of communications.

Aspects presented herein may provide enhancements to support duplex evolution for 5G NR TDD in unpaired spectrum. Aspects presented herein may include, without limitation, duplex enhancements at the network side (e.g., the gNB side), HD operation at the UE side, and no restriction on frequency ranges. The aspects may be applicable via deployment scenarios, methodologies for duplex enhancements, as well as for SB non-overlapping FD (generally, SBFD herein) and enhancements on dynamic/flexible TDD. The SBFD mode at a UE includes FD capability and performance associated with SBs within one or more given slots. For example, a given slot may be configured to include one or more UL SBs and/or DL SBs, and each of the SBs may be a BWP or a RB. SBFD operations may refer to the handling, reception, and/or transmission of these SBs in the SBFD mode. The HD mode, which may also be referred to as a "legacy" mode, at a UE includes a single UL band or DL band in a given slot, and HD operations may refer to the handling, reception, and/or transmission of these UL and DL bands in the HD mode. Relatedly, HD-to-SBFD mode filter switching, or generally HD-to-SBFD filter switching, may be associated with its own latency for a UE, and may be a switch between HD modes and SBFD modes of operation in which a UE reconfigures or retunes parameters and/or analog reception filters utilized for the HD mode, e.g., one UL or DL band per slot, and SBFD mode, with one or more UL SBs and DL SBs in a given slot (which may reduce or eliminate cross-link interference (CLI)).

Regarding non-overlapping SBFD and enhancements on dynamic/flexible TDD, aspects presented herein may account for schemes and their feasibility and performances characteristics, inter-gNB and inter-UE CLI handling as well as solutions to manage CLI, intra-subband CLI and inter-subband CLI in configurations of non-overlapping SBFD, and the performance of the identified schemes as well as the impact on legacy operation in configurations with co-existence in co-channel and adjacent channels. Aspects presented herein may also account for the feasibility of and impact on RF conditions considering adjacent-channel co-existence with the legacy operation, the feasibility of and impact on RF conditions considering the self-interference, the inter-subband CLI, and the inter-operator CLI at gNB (as well as the inter-subband CLI and inter-operator CLI at UE, and also feasibility aspects due to high impact in antenna/RF and algorithm design, which include antenna isolation, TX inter-modulation (IM) suppression in the RX part, filtering, and digital interference suppression), and deployability for the aspects herein related, e.g., to duplex enhancements in TDD unpaired spectrum.

As discussed below, various aspects herein relate to switching between SBFD and HD modes for different switching periodicities. Such aspects may enable a UE to provide its switching capabilities to a network node (e.g., BS, gNB, etc.), receive a configuration or an indication of a time/frequency location for SBs in SBFD operations, and switch to SBFD mode to perform operations, which increases UL duty cycle (e.g., provides latency reduction, UL coverage improvement, etc.), enhances system capacity, resource utilization, spectrum efficiency, etc., and enables flexible and dynamic UL/DL resource adaption. Accordingly, various aspects herein may achieve these improvements through informing the UE, e.g., a HD UE, of the time and/or frequency location of SB s that a network node, e.g., a gNB, would use for SBFD operations, and enabling the UE to switch between an HD mode of operation and a SBFD mode of operation. The UE modes and/or operations may be performed according to periodic (P) switching, semi-persistent (SP) switching, and/or aperiodic (AP) switching.

Figure 4:
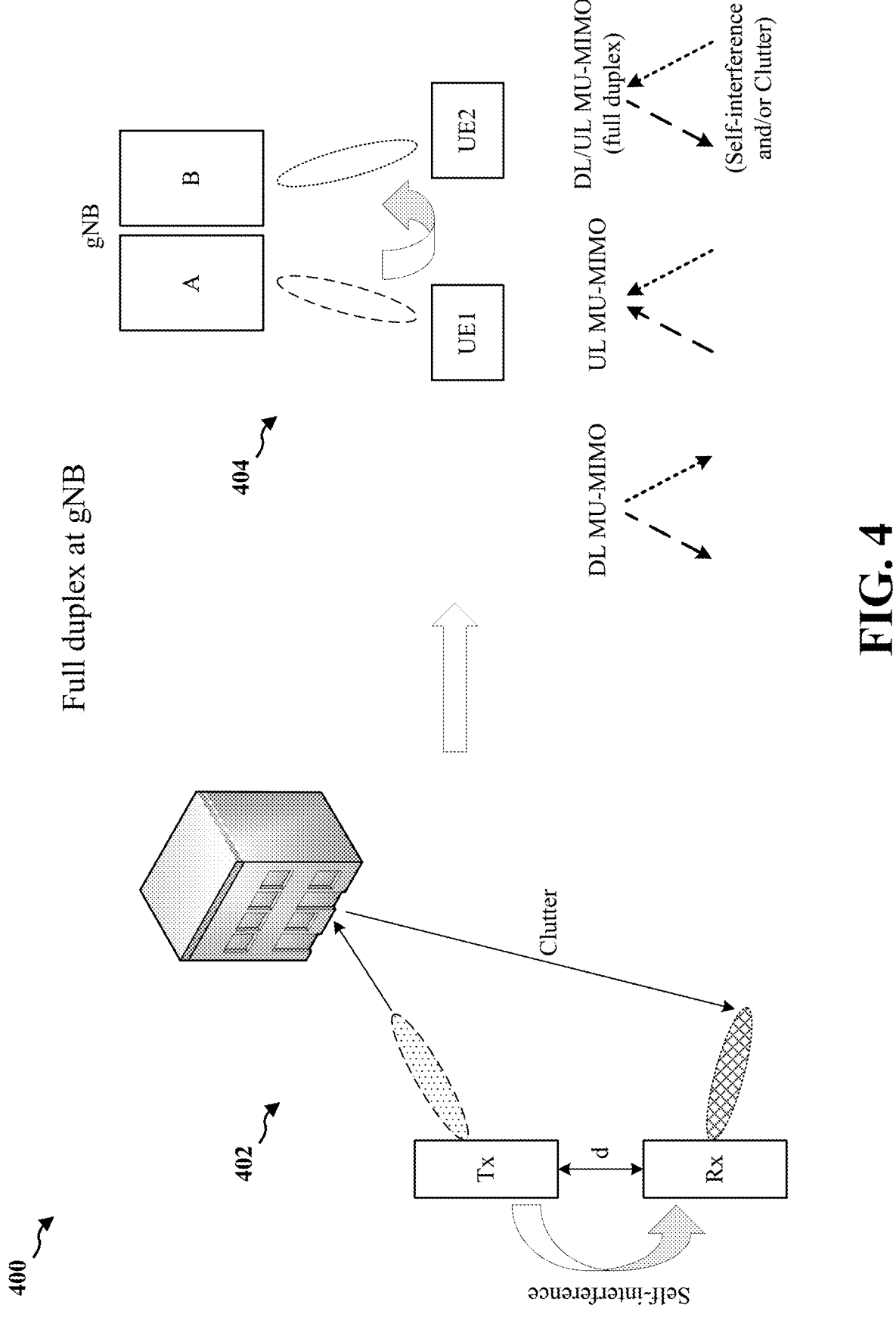
FIG. 4 is a diagram illustrating an example of full duplex (FD) wireless communications in a network, in accordance with various aspects of the present disclosure.

FIG. 4 is a diagram 400 illustrating an example of full duplex (FD) wireless communications in a network, in various aspects. Diagram 400 includes a first configuration 402 and a second configuration 404. In the first configuration 402, a transmitter (Tx) and a receiver (Rx) of a network node (e.g., a BS, gNB, etc.) are shown transmitting and receiving communication signals. The transmitter (Tx) and the receiver (Rx) experience self-interference, e.g., from leaking signals, and the receiver (Rx) receives clutter (or echo) due to the signal from the transmitter (Tx) being reflected from a building. As noted above, these issues impair signals in communications, e.g., in network-side FD modes.

These issues are further shown for FD mode on the network side in the second configuration 404. A network node, e.g., here a gNB, has a Tx antenna panel A for transmitting/DL and an Rx antenna panel B for receiving/UL. As shown, the gNB may be configured to perform DL multi-user (MU) MIMO between a UE1 (a HD UE) and a UE2 (a HD UE), as well as UL MU-MIMO between the UE1 and the UE2. However, in DL/UL MU-MIMO (or FD mode), panel A transmits (DL) to UE1 while panel B has an L channel being received from UE2 simultaneously, and this causes self-interference and clutter issues in the wireless communications. Additionally, HD UEs themselves are not enabled to utilize FD efficiencies.

FIG. 5 is a diagram 500 illustrating an example of a SBFD configuration at a network node, in various aspects. Diagram 500 includes a SB configuration 502 and a network node configuration 504. In the SB configuration 502, simultaneous Tx/Rx of DL/UL on a sub-band basis is shown by way of example. For instance, in a slot, there may be a first DL portion, an UL portion, and a second DL portion across the component carrier/BW (although it should be noted that more or fewer of each portion type may be included in various aspects and/or that more UL portions than DL portions may be present). As noted above, the SBFD mode and SBFD operations at a UE include FD capability and performance associated with SBs within one or more given slots, where a given slot may include one or more UL SBs and/or DL SBs, and each of the SBs may be a BWP or a RB. That is, SB configuration 502 illustrates SBFD at the network side where different SBs within a component carrier (CC) or cross-CC are used for DL UE and UL UE signaling. For the illustrated configuration over one slot, the DL may use two outer DL SBs to communicate, and for UL, the middle UL SB may be used to transmit. Referring to the network node configuration 504, a gNB 506 is shown having a panel for Tx panel 508 that may be communicating over a DL channel with a UE1, while a panel for Rx panel 510 may be communicating over an UL channel with a UE2 (where the Tx panel 508 and the Rx panel 510 are adjacent each other on gNB 506). The network node configuration 504 thus illustrates a FD gNB with simultaneous Tx/Rx on the same slot.

According to various aspects herein, such a configuration, e.g., when utilized with UE-side aspects described below, provide improvements in communication system and apparatus efficiency, signal quality, power utilization, etc. For example, and without limitation, aspects presented herein may increase an UL duty cycle leading to latency reduction (e.g., it may be possible to receive DL signal in UL-only slots, which can enable latency savings) as well as provide UL coverage improvement, enhance system capacity/resource utilization/spectrum efficiency, enable flexible and dynamic UL/DL resource adaption according to UL/DL traffic in a robust manner, etc.

Figure 6:
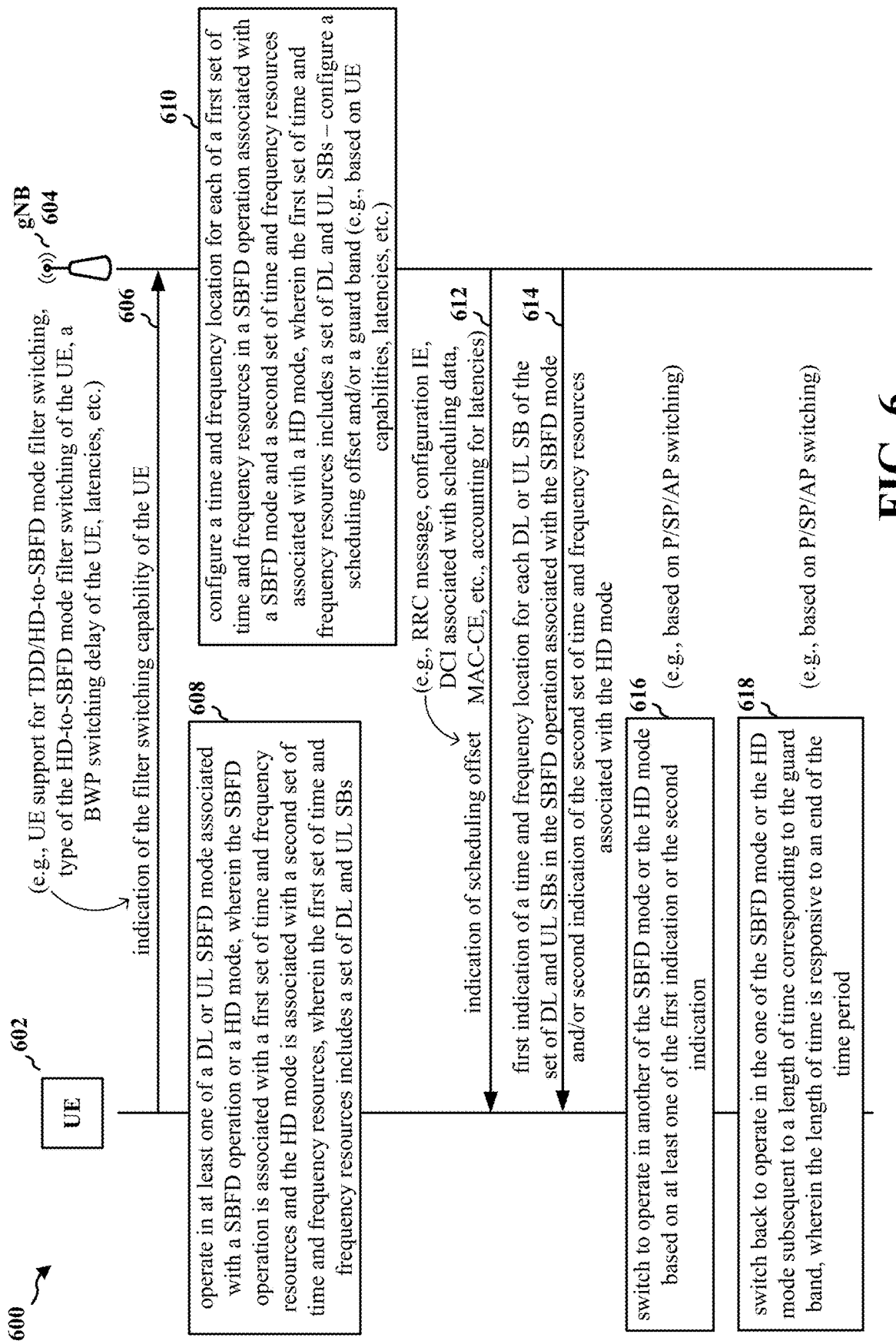
FIG. 6 is a call flow diagram for wireless communications, in accordance with various aspects of the present disclosure.

FIG. 6 is a call flow diagram 600 for wireless communications, in various aspects. Call flow diagram 600 illustrates switching between SBFD and HD modes for different periodicities.

In the illustrated aspect, a UE 602 transmits, to a network node (e.g., a gNB 604 or one or more components of a gNB) (also "gNB 604" herein), indication 606 of the filter switching capability of the UE 602. The indication 606 transmitted to the gNB 604, in aspects, may be, without limitation, support of the UE for SBFD operations, support of the UE for TDD, support of the UE for HD-to-SBFD mode filter switching, at least one of a type of the HD-to-SBFD mode transmitter or receiver filter switching of the UE, and/or a bandwidth part (BWP) switching delay of the UE. The UE 602 may operate (at 608) in at least one of a DL or UL SBFD mode associated with a SBFD operation or a HD mode. In one configuration, the SBFD operation may be associated with a first set of time and frequency resources, and in another configuration, the HD mode may be associated with a second set of time and frequency resources. In one configuration, the first set of time and frequency resources may include a set of DL and UL SBs. It should be noted that while the illustrated example shows indication 606 transmitted to gNB 604 prior to the UE operating (at 608) in an SBFD or HD mode, aspects presented herein may also contemplate and include that indication 606 may be transmitted while the UE is operating (at 608) in the SBFD or HD mode.

The gNB 604 may configure (at 610) a time and frequency location for each of a first set of time and frequency resources in a SBFD operation associated with a SBFD mode and a second set of time and frequency resources associated with a HD mode. In one configuration, the first set of time and frequency resources includes a set of DL and UL SBs. The gNB 604 may also configure (at 610) a scheduling offset and/or a guard band (or "guard period") associated with the SBFD and/or HD operations. In some aspects, the configurations at 610 may be based on the UE 602 capabilities, latencies, etc. (e.g., indication 606). Additionally, it should be noted that while the illustrated example shows operating at 608 by the UE 602 in the SBFD or HD mode as preceding the gNB 604 configuring at 610, aspects herein also contemplate and include that operating at 608 by the UE 602 and configuring at 610 by the gNB 604 may be concurrent/partially concurrent with respect to each other, that either one may precede the other, etc.

In one configuration, the gNB 604 may configure (at 610) each SB of the set of DL and UL SBs as a RB set within a corresponding BWP in a set of BWPs or a corresponding CC in a set of CCs. The gNB 604 may configure each SB of the set of DL and UL SBs as the RB set based on a lack of support of the UE for HD-to-SBFD mode filter switching (e.g., from indication 606). The gNB 604 may configure each SB of the set of DL and UL SBs as the RB set and as being associated with an adjustable scheduling offset that may be greater than or equal to a SBDF filter adaptation latency of the UE 602. In one configuration, the gNB 604 may configure (at 610) each SB of the set of DL and UL SBs as a RB set for a UE-dedicated configuration and/or a cell-common configuration (e.g., a common configuration for UEs serviced in a given cell associated with a network entity). In one configuration, the set of DL and UL SBs may include one or more DL SBs and at least one UL SB, and the set of BWPs may include one or more DL BWPs and an UL BWP. In such a configuration, each of the one or more DL SBs may be configured as a corresponding DL BWP and the UL SB may be configured as a corresponding UL BWP, and the one or more DL BWPs may be active at a single time instance and the UL BWP may be active at the single time instance.

In one configuration, the gNB 604 may configure (at 610) each SB of the set of DL and UL SBs as a corresponding BWP in a set of BWPs. In some aspects, the corresponding BWP may be configured to include UL SBs and non-contiguous DL SBs and/or non-centered UL SBs and non-centered DL SBs. In some aspects, each SB of the set of DL and UL SBs may be configured as the corresponding BWP in the set of BWPs based on support of the UE for HD-to-SBFD mode filter switching (e.g., from indication 606). In some aspects, each SB of the set of DL and UL SBs may be configured as the corresponding BWP in the set of BWPs and may be associated with an adjustable scheduling offset that may be less than a BWP switching latency of the UE. In one configuration, the set of DL and UL SBs may include one or more DL SBs and at least one UL SB, and the set of BWPs may include one or more DL BWPs and an UL BWP. In such a configuration, each of the one or more DL SBs may be configured as a corresponding DL BWP and the UL SB may be configured as a corresponding UL BWP, and the one or more DL BWPs may be active at a single time instance and the UL BWP may be active at the single time instance. In one configuration, the set of DL and UL SBs may include a DL SB and one or more UL SBs, and the set of BWPs includes a DL BWP and one or more UL BWPs. In such a configuration, the DL SB may be configured as a corresponding DL BWP and each of the one or more UL SBs may be configured as a corresponding UL BWP, and the DL BWP may be active at a single time instance and the one or more UL BWP may be active at the single time instance. In the configuration, the one or more DL SBs may include two non-contiguous DL SBs, the two non-contiguous DL SBs may be configured as a non-contiguous DL BWP, and the non-contiguous DL BWP may be active at the single time instance and the corresponding UL BWP may be active at the single time instance. In one configuration, the set of DL and UL SBs may include one or more DL SBs and an UL SB, and the one or more DL SBs may be configured as a corresponding DL BWP and the UL SB may be configured as a corresponding UL BWP. In such a configuration, the corresponding DL BWP and the corresponding UL BWP may include a same center frequency. In one configuration, the set of DL and UL SBs may include a DL SB and one or more UL SBs, the DL SB may be configured as a corresponding DL BWP and the one or more UL SBs may be configured as a corresponding UL BWP, and the corresponding DL BWP and the corresponding UL BWP may include a same center frequency. In the configuration, the one or more UL SBs may include two non-contiguous UL SBs, the two non-contiguous UL SBs may be configured as a non-contiguous UL BWP, and the non-contiguous UL BWP may be active at a single time instance and the corresponding DL BWP may be active at the single time instance.

In one configuration, each SB of the set of DL and UL SBs may be configured as the corresponding BWP in the set of BWPs if the UE supports HD-to-SBFD mode filter switching. In one configuration, each SB of the set of DL and UL SBs may be configured as the corresponding BWP in the set of BWPs and may be associated with an adjustable scheduling offset that may be less than a BWP switching latency of the UE.

Regarding the scheduling offset and guard band, the gNB 604 may configure (at 610) the scheduling offset and/or the guard band where the scheduling offset may be associated with SP switching and AP switching, and where the guard band may be associated with P switching or AP switching. In some aspects, the filter switching capability of the UE 602 (indication 606 of which may be transmitted to the gNB 604) may be associated with the scheduling offset for the SP switching, the guard band for the P switching, and/or the scheduling offset and the guard band for the AP switching. The gNB 604 may configure (at 610) the scheduling offset based on signaling and as including a number of symbols having a SCS associated with the signaling or a duration of time. In some aspects, the signaling includes DCI associated with the scheduling data, a first ACK of the DCI associated with the scheduling data, a UL transmission associated with the DCI associated with the scheduling data, and/or a second ACK of other DCI not associated with the scheduling data. In some aspects, a time period of the SBFD mode or the HD mode for the AP switching may include a number of symbols and/or a duration of time.

The UE 602 may receive an indication 612 of the scheduling offset. In aspects, the indication 612 includes information related to the scheduling offset being an adjustable scheduling offset. For example, as noted above, each SB of the set of DL and UL SBs may be configured as the RB set and as being associated with an adjustable scheduling offset that may be greater than or equal to a SBDF filter adaptation latency of the UE 602, and each SB of the set of DL and UL SBs may be configured as the corresponding BWP in the set of BWPs and be associated with an adjustable scheduling offset that may be less than a BWP switching latency of the UE 602. In some aspects, the indication 612 may be the indication configured by the gNB 604 (at 610). The UE 602 may receive the indication 612 via a RRC message (e.g., in BWP information element (IE) (such as a flag "1" or "0" for an adjustable offset or not), a configuration IE (e.g., of a serving cell), DCI associated with scheduling data (e.g., BWP switching DCI), and/or a MAC-CE, in various aspects and configurations. The indication 612 may be received by the UE 602 via a transmission from the gNB 604.

The UE 602 may obtain indication(s) 614, e.g., subsequent to receiving the indication 612. In aspects, the indication(s) 614 may include the time and frequency location(s) and/or the set of time and frequency resources configured by the gNB 604 (at 610). The UE 602 may obtain the indication(s) 614 as (1) a first indication of a time and frequency location for each SB of the set of DL and UL SBs in the SBFD operation associated with the SBFD mode, and/or as (2) a second indication of the set of time and frequency resources associated with the HD mode. In one configuration, to obtain the indication(s) 614, the UE 602 may receive via a transmission from gNB 604.

The UE 602 at 616 switches to operate in another of the SBFD mode or the HD mode based on the first indication and/or the second indication of indication(s) 614. The UE 602 switching at 616 may be based at least on, and/or be responsive to, receiving indication(s) 614. Subsequent to the switch at 616, the UE 602 may be configured to communicate with the gNB 604 according to the switched-to mode of operation (not shown for illustrative clarity, but as would be understood by persons of ordinary skill in the relevant art(s) having the benefit of this disclosure). As described above, the UE 602 may operate (at 608) in one of a SBFD mode associated with a SBFD operation or a HD mode. The switch at 616 may configure the UE 602 to switch between these operating modes. In one configuration, where the UE 602 operates (at 608) in a HD mode, the switch at 616 configures the UE 602 to operate in the SBFD mode. Conversely, in one configuration, where the UE 602 operates (at 608) in a SBFD mode, the switch at 616 configures the UE 602 to operate in the HD mode. In one configuration, the first indication and the second indication are included in a single received indication for a semi-static switching pattern that may specify a repeating and/or alternating switching between the SBFD mode and the HD mode. For example, and not by way of limitation, a semi-static switching pattern may specify a first number of symbols/slots in which to operate in the SBFD mode and a second number of symbols/slots in which to operate in the HD mode.

In aspects, the switch at 616 may be based at least in part on P switching timing (which may be based on a predefined switching pattern or time period), SP switching timing (which may be based on activation/deactivation signaling, such as from the network node (e.g., the gNB 604)), and/or AP switching timing (which may be based on a number of symbols, slots, a time period, and/or the like). Further details regarding SBFD and HD modes are provided in below with respect to FIGS. 7, 8, and 9.

The UE 602 at 618 switches back to operate in the one of the SBFD mode or the HD mode subsequent to a length of time corresponding to the guard band, where the length of time may be responsive to an end of the time period. In various configuration, timing for P switching, SP switching, and/or AP switching may determine when the UE 602 at 618 switches back. In aspects, for P switching, a switching latency may depend on guard period, for SP switching, a switching latency may depend on a scheduling offset, and for AP switching, a switching latency may depend on the scheduling offset and the guard period for switching back after a time window. For example, in one configuration for which the UE 602 switches at 616 to operate in the BFD mode from the HD mode, the UE 602 switches back to the HD mode. In such an example, the switch back at 618 may be performed by the UE 602 subsequent to expiration of a switch time/period of the SBFD mode operation (e.g., an end of the time period) and after application of the guard band's length of time.

Figure 7:
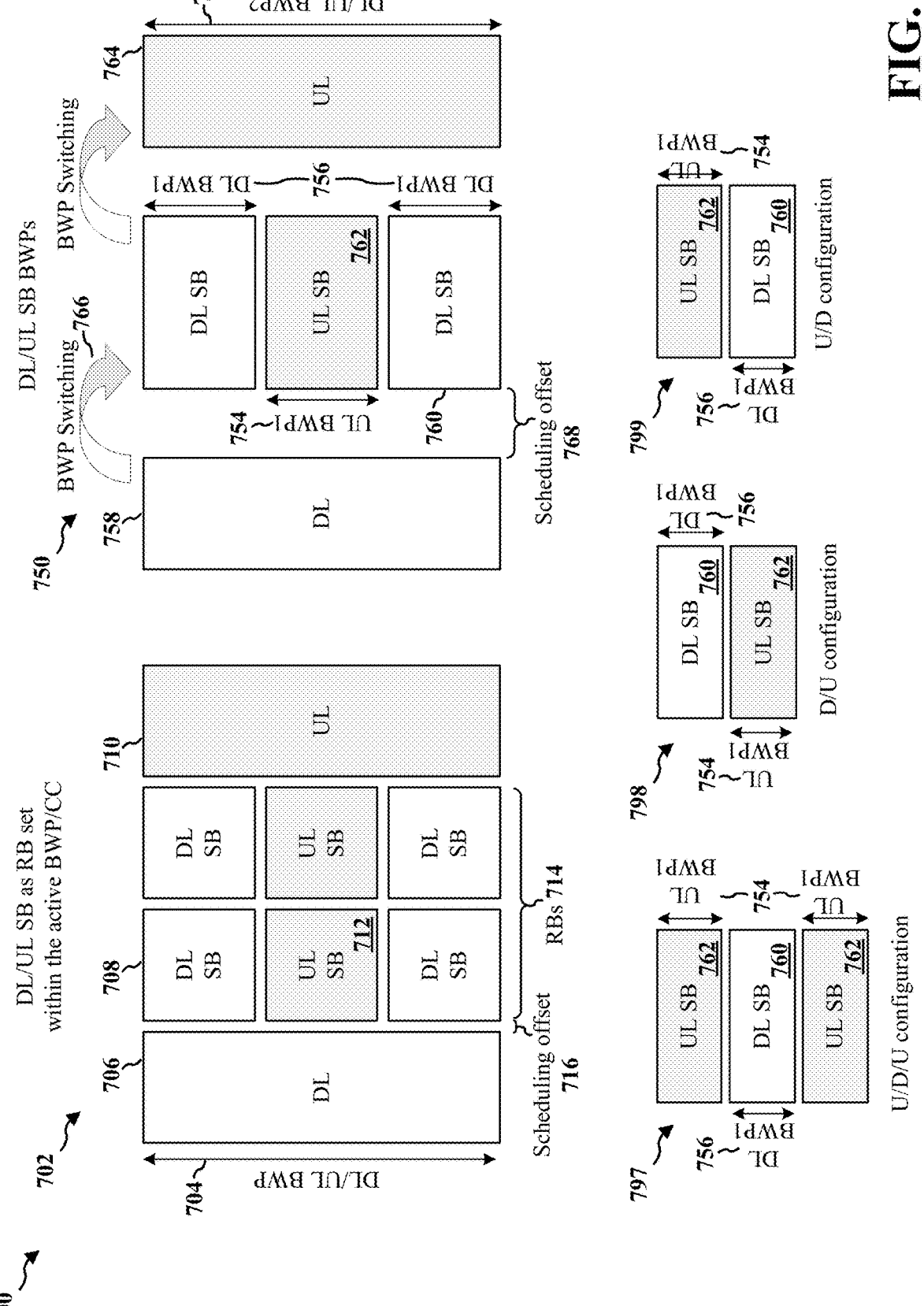
FIG. 7 is a diagram illustrating example configuration structures for switching between SBFD and half duplex (HD) modes, in accordance with various aspects of the present disclosure.

FIG. 7 is now described below, in the context of FIG. 6 as described above. FIG. 7 shows a diagram 700 of configuration structures for switching between SBFD and HD modes, in various aspects. Diagram 700 includes a configuration structure 702 and a configuration structure 750. Configuration structure 702 illustrates DL/UL SB as a RB set within the active BWP/CC, and configuration structure 750 illustrates DL/UL SB BWPs. As noted for aspects herein, the SBFD mode and SBFD operations at a UE include FD capability and performance associated with SBs within one or more given slots, where a given slot may include one or more UL SBs and/or DL SBs, and each of the SBs may be a BWP or a RB. Also, the legacy HD mode and HD operations at a UE include a single UL band or DL band in a given slot. Configuration structure 702 and configuration structure 750 enable UEs that do not support HD-to-SBFD filter switching to achieve the benefits described herein without filter switching via SB signaling with short switching latency, and enable UEs that support HD-to-SBFD filter switching to also achieve the described benefits with filter switching via non-contiguous DL BWP with the same switching latency as legacy/HD BWP switching.

In the configuration structure 702, DL band 706 may be associated with a DL/UL BWP 704. In aspects, DL/UL BWP 704 may correspond to a HD (e.g., legacy) mode of operation as a single band in a slot (e.g., see (608) in FIG. 6). Similarly, UL band 710 (a single band in a slot) may correspond to the HD mode of operation (e.g., see (618) in FIG. 6), and may be associated with the DL/UL BWP 704. RBs 714 may conversely correspond to a SBFD mode of operation (e.g., see (616) in FIG. 6) and may include a number of DL SBs 708 and a number of UL SBs 712. In aspects, RBs 714 may be a set of RBs. That is, each SB (DL SBs 708 and UL SBs 712; multiple SBs in a given slot) may be configured as an RB-set, e.g., RBs 714, within the BWP/CC (shown as DL/UL BWP 704, by way of example) (see e.g., indication(s) 614 in FIG. 6). HD mode and SBFD mode signaling is shown in the configuration structure 702 as being associated with an offset that may be implemented for signaling in the configuration structure 702 by application of a scheduling offset 716 (e.g., based on the indication 612 of scheduling offset received by the UE 602 in FIG. 6). In some aspects, signaling in the configuration structure 702 may be cell-common or UE-dedicated for such SB configurations.

The configuration structure 702 may be utilized based on UE capabilities (e.g., as provided through indication 606 in FIG. 6). In aspects, the configuration structure 702 may be utilized, e.g., by the UE 602, based on the UE not supporting HD-to-SBFD filter switching (e.g., for the mode switch at 616 in FIG. 6). In such cases, if the UE does not expect to receive non-contiguous DL BWP configuration or switching, the configuration structure 702 does not specify DL BWP configuration or switching, and therefore, operation of the UE is not impeded for achieving the benefits herein for SBFD via RBs 714.

As described above with reference to FIG. 6, for various configurational aspects, each SB of the set of DL and UL SBs as a RB may be set for a UE-dedicated configuration and/or a cell-common configuration (e.g., a common configuration for UEs serviced in a given cell associated with a network entity).

In the configuration structure 750, DL band 758 and/or UL band 764 may be associated with a DL/UL BWP2 752, and may correspond to a HD (e.g., legacy) mode of operation. As shown, DL/UL SB BWPs may include a number of DL SBs 760 associated with a DL BWP1 756 and a number of UL SBs 762 associated with an UL BWP1 754. That is, in aspects for the illustrated configuration, each SB (DL SBs 760 and UL SBs 762) may be configured as a BWP (see e.g., indication(s) 614 in FIG. 6). Aspects herein contemplate and/or account for multiple BWPs configurations (e.g., TDD, SBFD), for BWP switching delay (due to baseband parameters retune), etc. Additionally, non-centered UL/DL BWPs (e.g., DL SBs 760 and UL SBs 762 are closer to one of DL band 758 or UL band 764), non-contiguous DL BWPs (e.g., as shown), etc., are also contemplated. HD mode and SBFD mode signaling is shown in the configuration structure 750 as being associated with a switching latency of BWP switching 766 that may be implemented for signaling in the configuration structure 750 by application of a scheduling offset 768 (e.g., based on the indication 612 of scheduling offset received by the UE 602 in FIG. 6). In one configuration, the scheduling offset 768 may correspond to the switching latency of the BWP switching 766.

The configuration structure 750 may also be utilized based on UE capabilities (e.g., as provided through indication 606 in FIG. 6). In aspects, the configuration structure 750 may be utilized, e.g., by the UE 602, based on the UE supporting HD-to-SBFD filter switching (e.g., for the mode switch at 616 in FIG. 6). For SP switching, the SB signaling (e.g., via DCI) may have a fixed scheduling offset with an offset less than the SBFD filter adaptation latency. Thus, if the UE does not expect to receive the SB signaling, the configuration structure 752 does not specify the SB signaling as in the legacy HD mode. For P switching, the SB signaling may have a predefined guard band between HD and SBFD modes of operation with a guard band duration less than the SBFD filter adaptation latency. Thus, if the UE does not expect to receive the SB signaling, the configuration structure 752 does not specify the SB signaling as in the legacy HD mode. In addition, for AP switching, which may configure with a time window (e.g., N ms or K slots or the like) to apply SB configuration for the SBFD mode of operation, a scheduling offset may be utilized for decoding the DCI for AP switching plus HD-to-SBFD filter switching latency. Further, a guard band may be utilized for switching back, e.g., to HD from SBFD, after the time window. Thus, if the UE does not expect to receive the SB signaling, the configuration structure 752 does not specify the SB signaling as in the legacy HD mode. Based on the above, operation of the UE is not impeded for achieving the benefits herein for SBFD via DL SBs 760 and UL SBs 762.

Configuration structure 702 and configuration structure 750 show example configurations for DL/UL/DL (also "D/U/D") SBs for non-limiting illustrative purposes. In other configurations, alternative orderings and numbers of SBs may be implemented. For example, in one configuration a configuration structure 797 shown in FIG. 7 is implemented. In configuration structure 797, a UL/DL/UL configuration (also "U/D/U") is provided by way of example with reference to two of the UL SBs 762 corresponding to the UL BWP 754 and one DL SB 760 corresponding to the DL BWP 756. In one configuration a configuration structure 798 shown in FIG. 7 is implemented. In configuration structure 798, a DL/UL configuration (also "D/U") is provided by way of example with reference to one of the UL SBs 762 corresponding to the UL BWP 754 and one of the DL SBs 760 corresponding to the DL BWP 756. In one configuration a configuration structure 799 shown in FIG. 7 is implemented. In configuration structure 799, a UL/DL configuration (also "U/D") is provided by way of example with reference to one of the UL SBs 762 corresponding to the UL BWP 754 and one of the DL SBs 760 corresponding to the DL BWP 756. In other words, configurations for SBs according to aspects herein may vary in order and number.

Figure 8:
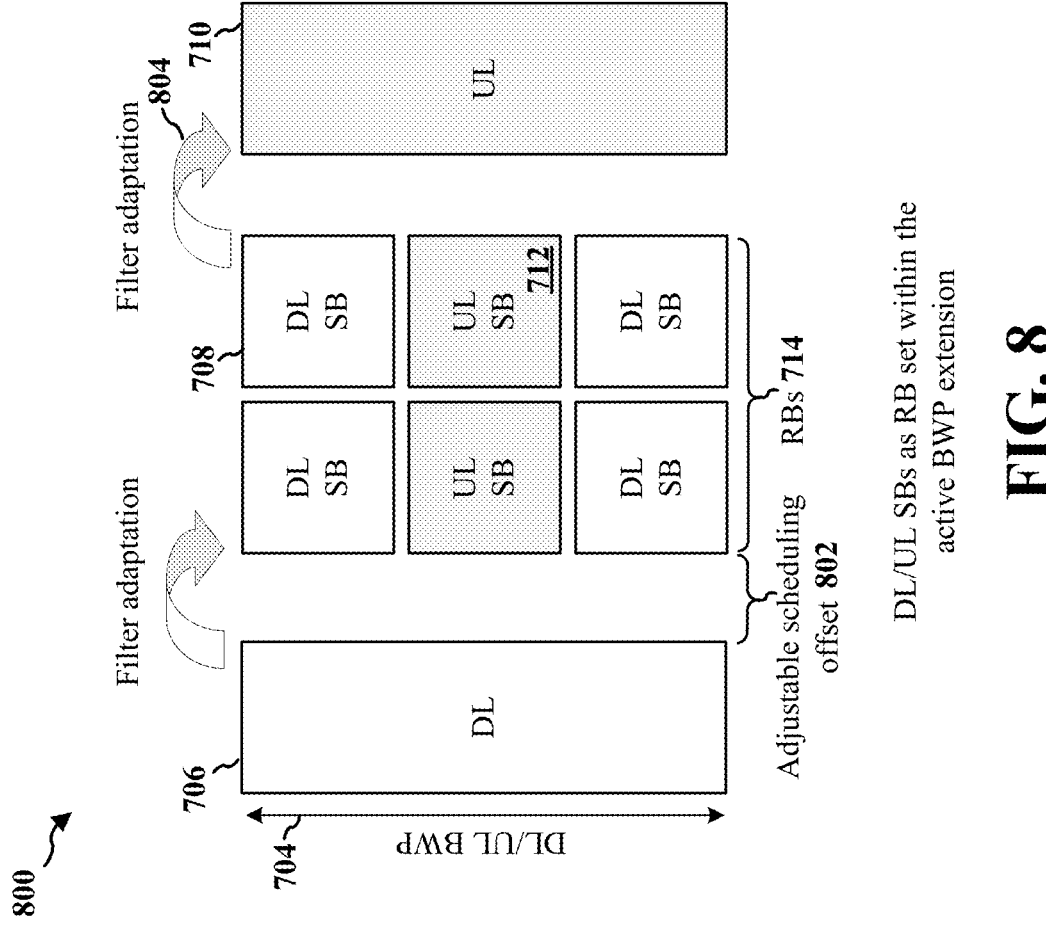
FIG. 8 is a diagram illustrating an example configuration structure for switching between SBFD and HD modes, in accordance with various aspects of the present disclosure.

FIG. 8 is described below, in the context of FIGS. 6 and 7 as described above. FIG. 8 shows a diagram 800 of a configuration structure for switching between SBFD and HD modes, in various aspects. Diagram 800 may be a further aspect of configuration structure 702 in FIG. 7—the illustrated configuration structure in diagram 800 illustrates an extension of configuration structure 702 for DL/UL SB as a RB set within the active BWP/CC.

Diagram 800 shows the DL band 706 and the UL band 710 corresponding to the DL/UL BWP 704, as well as the RBs 714 (e.g., including the DL SBs 708 and the UL SBs 712, in FIG. 7 (of the configuration structure 702) as described above. The extension illustrated in diagram 800 for configuration structure 702 includes an adjustable scheduling offset 802, which may be a dynamic or adjustable aspect of the scheduling offset for which the indication 612 in FIG. 6 is received. For example, the configuration structure of diagram 800 may differ from configuration structure 702 at least in that the SBFD portion represented by RBs 714 does not immediately follow the HD mode portion represented by the DL band 706 and does not immediately precede the HD mode portion represented by the UL band 710. Instead, the aspects of the configuration structure shown in diagram 800 provide for the adjustable scheduling offset 802 between the HD and SBFD mode portions which enables a UE, e.g., the UE 602 in FIG. 6, to support SB signaling as shown in the configuration structure 702 regardless of whether the UE supports filter adaptation 804 (e.g., SBDF filter adaptation) or not.

The filter adaptation 804 illustrated in diagram 800 represents the filter adaptation latency expected by a UE that supports HD-to-SBFD filter switching. That is, when such filter switching is supported in contrast to utilization of the configuration structure 702, the UE expects the offset to be no less than (e.g., greater than or equal to) the SBFD filter adaptation latency. Accordingly, the adjustable scheduling offset 802 may be no less than the SBFD filter adaptation latency for SB signaling (e.g., via DCI). Simply put, the adjustable scheduling offset 802 may provide a longer offset that indicates to the UE a HD-to-SBFD filter change.

Figure 9:
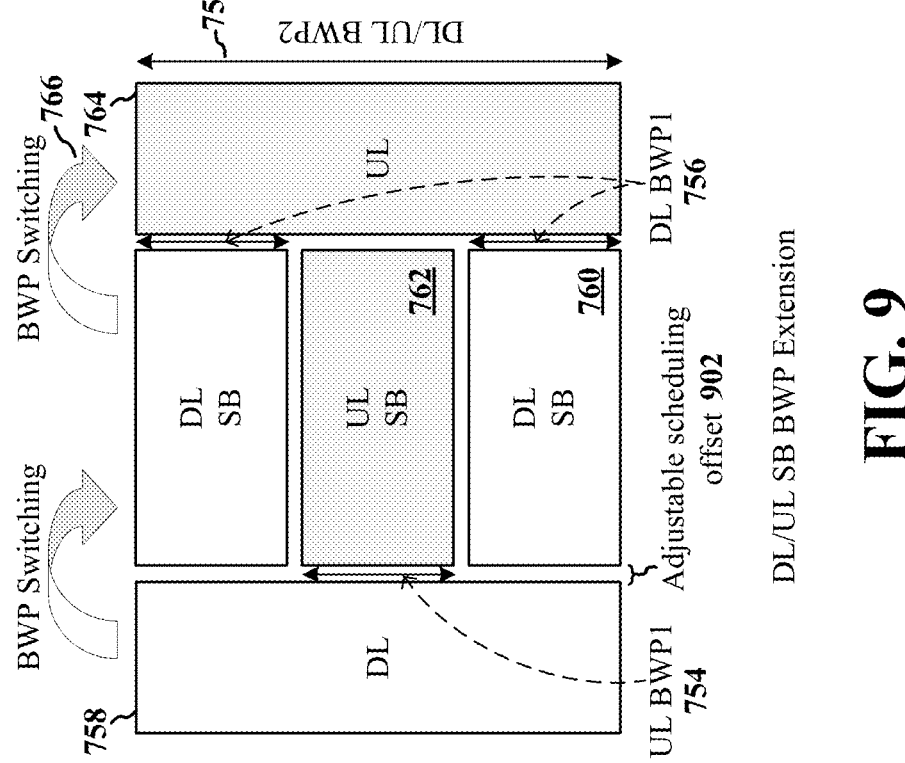
FIG. 9 is a diagram illustrating an example configuration of switching between SBFD and HD modes, in accordance with various aspects of the present disclosure.

FIG. 9 is described below, in the context of FIGS. 6 and 7 as described above. FIG. 9 shows a diagram 900 of a configuration structure for switching between SBFD and HD modes, in various aspects. Diagram 900 may be a further aspect of configuration structure 750 in FIG. 7—the illustrated configuration structure in diagram 900 illustrates an extension of configuration structure 750 for DL/UL SB BWPs.

Diagram 900 shows the DL band 758 and the UL band 764 corresponding to the DL/UL BWP2 752, as well as the DL SBs 760 and UL SBs 762, in FIG. 7 (of the configuration structure 750) as described above. The extension illustrated in diagram 900 for configuration structure 750 includes an adjustable scheduling offset 902, which may be a dynamic or adjustable aspect of the scheduling offset for which the indication 612 in FIG. 6 is received. For example, the configuration structure of diagram 900 may differ from configuration structure 750 at least in that the SBFD portion represented by the DL SBs 760 and UL SBs 762 does not follow the HD mode portion represented by the DL band 758, and does not precede the HD mode portion represented by the UL band 764, by an offset correspond to the switching latency of the BWP switching 766. Instead, the aspects of the configuration structure shown in diagram 900 provide for the adjustable scheduling offset 902 between the HD and SBFD mode portions which enables a UE, e.g., the UE 602 in FIG. 6, to support SB signaling with non-contiguous DL BWP as shown in the configuration structure 750 regardless of whether the UE supports SBFD filter adaptation or not.

The BWP switching 766 illustrated in diagram 900 represents the switching latency offset that may be implemented for signaling in the configuration structure 750 in FIG. 7 by application of the scheduling offset 768. That is, when the BWP switching 766 is not supported by a UE, in contrast to utilization of the configuration structure 752, the UE expects the offset to be less than the legacy BWP switching latency/ offset (e.g., 1 ms). Accordingly, the adjustable scheduling offset 902 may be less than the legacy BWP switching latency associated with the BWP switching 766 for SB signaling (e.g., via DCI). Simply put, the adjustable scheduling offset 902 may provide a shorter offset that indicates to the UE no filter switching and a scheduling offset approximately equal to or similar to scheduling offset 716 in FIG. 7 (which may be relatively very small, e.g., near 0 (zero)).

As described above for FIG. 6, the UE 602 may receive the indication 612 via a RRC message, a configuration IE, DCI associated with scheduling data, and/or a MAC-CE, in various aspects and configurations. The extension of configuration structure 750 shown in diagram 900 via the adjustable scheduling offset 902 may include various configurations for defining the adjustable scheduling offset 902. For example, and without limitation, the adjustable scheduling offset 902 may be defined based on signaling as a number of N symbols (having a SCS associated with the signaling) or K s/ms/etc. (a unit of time), where the signaling may be the DCI associated with the scheduling data, a first ACK of the DCI associated with the scheduling data, a UL transmission associated with the DCI associated with the scheduling data, and/or a second ACK of other DCI not associated with the scheduling data. In configurations using symbols, as described above, the SCS may be based at least in part on the SCS of the DCI, the ACK, the applied DL/UL BWP SCS, and/or the like.

FIG. 10 is a flowchart 1000 of a method of wireless communication, in accordance with various aspects of the present disclosure. The method may be performed by a UE (e.g., the UE 104, 602; the apparatus 1404). At 1002, the UE operates in at least one of a DL or UL SB full duplex (SBFD) mode associated with a SBFD operation or a HD mode, where the SBFD operation is associated with a first set of time and frequency resources and the HD mode is associated with a second set of time and frequency resources, and where the first set of time and frequency resources includes a set of DL and UL SBs. In some aspects, 1002 may be performed by the component 198. Additionally, at 1004, the UE obtains at least one of (1) a first indication of a time and frequency location for each DL or UL SB of the set of DL and UL SBs in the SBFD operation associated with the SBFD mode, or (2) a second indication of the second set of time and frequency resources associated with the HD mode. In some aspects, 1004 may be performed by the component 198. Further at 1006, the UE switches to operate in another of the SBFD mode or the HD mode based on at least one of the first indication or the second indication. In some aspects, 1006 may be performed by the component 198. For example, referring to FIG. 6, the UE 602 may operate (at 608) in the SBFD mode or the HD mode. The HD mode may include legacy signaling or bands (e.g., DL band 706, 758 and UL band 710, 764 as shown in FIGS. 7, 8, 9). In addition, the UE 602 may obtain an indication(s) 614, e.g., from the gNB 604, that include a first indication of a time and frequency location for each DL or UL SB of the set of DL and UL SBs (e.g., RBs 714, DL SBs 760, and UL SBs 762 shown in FIGS. 7, 8, 9) in the SBFD operation (702, 750 of FIG. 7; 800 of FIG. 8; 900 of FIG. 9) associated with the SBFD mode, and/or may include a second indication of the second set of time and frequency resources associated with the HD mode. In addition, the UE 602 may switch (616) to operate the other of the SBFD mode or the HD mode in which the UE 602 operates (at 608) based on the indication for the SBFD mode or the indication for the HD mode.

FIG. 11 is a flowchart 1100 of a method of wireless communication, in accordance with various aspects of the present disclosure. The method may be performed by a UE (e.g., the UE 104, 602; the apparatus 1404). At 1102, the UE transmits, to a network node and prior to the at least one of the first indication or the second indication being obtained, an indication of the filter switching capability of the UE for at least one of: support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE. For example, referring to FIG. 6, the UE 602 may transmit the indication 606 to the gNB 604. The indication 606 may include support of the UE 602 for TDD and/or support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE 602 (e.g., BWP switching 766 of FIGS. 7, 9), and/or latencies for modes of operation, switching, tuning, etc. (e.g., scheduling offset 716, 768 of FIG. 7; filter adaptation 804 of FIG. 8). The first indication and/or the second indication may be based on at least a portion of the indication 606 of the filter switching capability of the UE 602. In some aspects, 1102 may be performed by the component 198.

At 1104, the UE operates in at least one of a DL or UL SBFD mode associated with a SBFD operation or a HD mode, where the SBFD operation is associated with a first set of time and frequency resources and the HD mode is associated with a second set of time and frequency resources, and where the first set of time and frequency resources includes a set of DL and UL SBs. For example, referring to FIG. 6, the UE 602 may operate (at 608) in the SBFD mode or the HD mode. The HD mode may include legacy signaling or bands (e.g., DL band 706, 758 and UL band 710, 764 as shown in FIGS. 7, 8, 9). In addition, the UE 602 may obtain an indication(s) 614, e.g., from the gNB 604, that include a first indication of a time and frequency location for each DL or UL SB of the set of DL and UL SBs (e.g., RBs 714, DL SBs 760, and UL SBs 762 shown in FIGS. 7, 8, 9) in the SBFD operation (702, 750 of FIG. 7; 800 of FIG. 8; 900 of FIG. 9) associated with the SBFD mode, and/or may include a second indication of the second set of time and frequency resources associated with the HD mode. In addition, the UE 602 may switch (616) to operate the other of the SBFD mode or the HD mode in which the UE 602 operates (at 608) based on the indication for the SBFD mode or the indication for the HD mode. In some aspects, 1104 may be performed by the component 198.

At 1106, the UE receives an indication of the scheduling offset via at least one of a RRC message, a configuration IE, DL control information DCI associated with scheduling data, or a MAC-CE. For example, referring to FIG. 6, the UE 602 may receive the indication 612 of the scheduling offset. In one configuration, the scheduling offset may be scheduling offset 716, 768 of FIG. 7. In one configuration, the scheduling offset may an adjustable scheduling offset such as adjustable scheduling offset 802 of FIG. 8 and/or adjustable scheduling offset 902 of FIG. 9. The scheduling offset indicated (612) may be based on, or may account for, latencies and/or switching support of the UE 602. In aspects, the UE 602 may receive the indication 612 with the scheduling offset from the gNB 604 via RRC message, configuration IE, DL control information DCI associated with scheduling data, or MAC-CE. In some aspects, 1106 may be performed by the component 198.

At 1108, the UE obtains at least one of (1) a first indication of a time and frequency location for each DL or UL SB of the set of DL and UL SBs in the SBFD operation associated with the SBFD mode, or (2) a second indication of the second set of time and frequency resources associated with the HD mode. For example, referring to FIG. 6, the UE 602 may obtain an indication(s) 614, e.g., from the gNB 604, that include a first indication of a time and frequency location for each DL or UL SB of the set of DL and UL SBs (e.g., RBs 714, DL SBs 760, and UL SBs 762 shown in FIGS. 7, 8, 9) in the SBFD operation (702, 750 of FIG. 7; 800 of FIG. 8; 900 of FIG. 9) associated with the SBFD mode, and/or may include a second indication of the second set of time and frequency resources associated with the HD mode. In some aspects, 1108 may be performed by the component 198.

At 1110, the UE switches to operate in another of the SBFD mode or the HD mode based on at least one of the first indication or the second indication. For example, referring to FIG. 6, the UE 602 may switch (616) to operate the other of the SBFD mode or the HD mode in which the UE 602 operates (at 608) based on the indication for the SBFD mode or the indication for the HD mode. For operating in the SBFD or HD modes, the UE 602 may utilize the indication 612 of the scheduling offset to be informed of the specific mode. Further, the UE 602 may utilize P/SP/AP switching for the operating modes. Referring to FIG. 7, for configurations that utilize P switching SP switching, the SB signaling (e.g., via DCI) may have a fixed scheduling offset with an offset less than the SBFD filter adaptation latency. Thus, if the UE does not expect to receive the SB signaling, the configuration structure 752 does not specify the SB signaling as in the legacy HD mode. For configurations that utilize P switching P switching, the SB signaling may have a predefined guard band between HD and SBFD modes of operation with a guard band duration less than the SBFD filter adaptation latency. Thus, if the UE does not expect to receive the SB signaling, the configuration structure 752 does not specify the SB signaling as in the legacy HD mode. In addition, for configurations that utilize P switching AP switching, which may configure with a time window (e.g., N ms or K slots or the like) to apply SB configuration for the SBFD mode of operation, a scheduling offset may be utilized for decoding the DCI for AP switching plus HD-to-SBFD filter switching latency. Further, a guard band may be utilized for switching back, e.g., to HD from SBFD, after the time window. Thus, if the UE does not expect to receive the SB signaling, the configuration structure 752 does not specify the SB signaling as in the legacy HD mode. In some aspects, 1110 may be performed by the component 198.

At 1112, the UE switches back to operate in the one of the SBFD mode or the HD mode subsequent to a length of time corresponding to the guard band, where the length of time is responsive to an end of the time period. For example, referring to FIG. 6, the UE 602 may switch at 618 back to the mode in which it was operating (at 608) prior to the switch at 616. For operating in the SBFD or HD modes, the UE 602 may utilize the indication 612 of the scheduling offset to be informed of the specific mode, and may utilize P/SP/AP switching for the operating modes. Referring to FIG. 7, for configurations that utilize SP switching, the SB signaling (e.g., via DCI) may have a fixed scheduling offset with an offset less than the SBFD filter adaptation latency. Thus, if the UE does not expect to receive the SB signaling, the configuration structure 752 does not specify the SB signaling as in the legacy HD mode. For configurations that utilize P switching, the SB signaling may have a predefined guard band between HD and SBFD modes of operation with a guard band duration less than the SBFD filter adaptation latency. Thus, if the UE does not expect to receive the SB signaling, the configuration structure 752 does not specify the SB signaling as in the legacy HD mode. In addition, for configurations that utilize P switching AP switching, which may configure with a time window (e.g., N ms or K slots or the like) to apply SB configuration for the SBFD mode of operation, a scheduling offset may be utilized for decoding the DCI for AP switching plus HD-to-SBFD filter switching latency. Further, a guard band may be utilized for switching back, e.g., to HD from SBFD, after the time window. Thus, if the UE does not expect to receive the SB signaling, the configuration structure 752 does not specify the SB signaling as in the legacy HD mode. In some aspects, 1112 may be performed by the component 198.

FIG. 12 is a flowchart 1200 of a method of wireless communication, in accordance with various aspects of the present disclosure. The method may be performed by a base station or other network entity (e.g., the base station 102; the gNB 604; the network entity 1502). At 1202, the network entity configures a time and frequency location for each of a first set of time and frequency resources in a SBFD operation associated with a SBFD mode and a second set of time and frequency resources associated with a HD mode, where the first set of time and frequency resources includes a set of DL and UL SBs. For example, referring to FIG. 6, the gNB 604 may configure (610) a time and frequency location for each SB of a set of DL and UL SBs in a SBFD operation associated with a SBFD mode and a set of time and frequency resources associated with a HD mode. The first set of time and frequency resources may include a set of DL and UL SBs. Additionally, in some aspects, the gNB 604 may configure (610) a scheduling offset and/or a guard band (e.g., based on the UE 602 capabilities, latencies, etc.). In some aspects, 1202 may be performed by the component 199.

At 1204, the network entity transmits, for a UE, at least one of (1) a first indication of the time and frequency location for each DL or UL SB of the set of DL and UL SBs in the SBFD operation associated with the SBFD mode, or (2) a second indication of the second set of time and frequency resources associated with the HD mode. For example, referring to FIG. 6, the gNB 604 may transmit an indication(s) 614, e.g., to the UE 602, that may include an indication for a SBFD mode at the UE 602 with a time and frequency location for each SB of the set of DL and UL SBs (e.g., RBs 714, DL SBs 760, and UL SBs 762 shown in FIGS. 7, 8, 9) in the SBFD operation (702, 750 of FIG. 7; 800 of FIG. 8; 900 of FIG. 9) associated with the SBFD mode, or may include an indication for a HD mode at the UE 602 with a set of time and frequency resources (e.g., DL band 706, 758 and UL band 710, 764 as shown in FIGS. 7, 8, 9). In some aspects, 1204 may be performed by the component 199.

FIG. 13 is a flowchart 1300 of a method of wireless communication, in accordance with various aspects of the present disclosure. The method may be performed by a base station or other network entity (e.g., the base station 102; the gNB 604; the network entity 1502). At 1302, the network entity receives, from the UE and prior to the time and frequency location(s) being configured, an indication of the filter switching capability of the UE for at least one of: support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE. For example, referring to FIG. 6, the gNB 604 may receive the indication 606 to the UE 602. The indication 606 may include support of the UE 602 for TDD and/or support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE 602 (e.g., BWP switching 766 of FIGS. 7, 9), and/or latencies for modes of operation, switching, tuning, etc. (e.g., scheduling offset 716, 768 of FIG. 7; filter adaptation 804 of FIG. 8). The first indication and/or the second indication may be based on at least a portion of the indication 606 of the filter switching capability of the UE 602. In some aspects, 1302 may be performed by the component 199.

At 1304, the network entity configures at least one of: a scheduling offset or a guard band, where the scheduling offset is associated with SP switching and AP switching, and where the guard band is associated with P switching or the AP switching, and where a filter switching capability of the UE is associated with at least one of: the scheduling offset for the SP switching, the guard band for the P switching, or the scheduling offset and the guard band for the AP switching. For example, referring to FIG. 6, gNB 604 may configure at 610 scheduling offsets. In one configuration, the scheduling offset may be configured as scheduling offset 716, 768 of FIG. 7. In one configuration, the scheduling offset may be configured as an adjustable scheduling offset such as adjustable scheduling offset 802 of FIG. 8 and/or adjustable scheduling offset 902 of FIG. 9, and filter switching capability may be based on these offsets, in various aspects. The scheduling offset configured at 610 may be based on, or may account for, latencies and/or switching support of the UE 602, such as those received via indication 606 at 1302. In some aspects, 1304 may be performed by the component 199.

At 1306, the network entity transmits an indication of the scheduling offset via at least one of a RRC message, a configuration IE, DL control information DCI associated with scheduling data, or a MAC-CE. For example, referring to FIG. 6, gNB 604 may transmit the indication 612 of the scheduling offset. In one configuration, the scheduling offset may be scheduling offset 716, 768 of FIG. 7. In one configuration, the scheduling offset may an adjustable scheduling offset such as adjustable scheduling offset 802 of FIG. 8 and/or adjustable scheduling offset 902 of FIG. 9. The scheduling offset indicated (612) may be based on, or may account for, latencies of the UE 602. In aspects, the gNB 604 may transmit the indication 612 with the scheduling offset to the UE 602 via RRC message, configuration IE, DL control information DCI associated with scheduling data, or MAC-CE. In some aspects, 1306 may be performed by the component 199.

At 1308, the network entity configures a time and frequency location for each of a first set of time and frequency resources in a SBFD operation associated with a SBFD mode and a second set of time and frequency resources associated with a HD mode, where the first set of time and frequency resources includes a set of DL and UL SB s. For example, referring to FIG. 6, the gNB 604 may configure (610) a time and frequency location for each SB of a set of DL and UL SBs in a SBFD operation associated with a SBFD mode and a set of time and frequency resources associated with a HD mode. The first set of time and frequency resources may include a set of DL and UL SBs. In some aspects, 1308 may be performed by the component 199.

At 1310, the network entity transmits, for a UE, at least one of (1) a first indication of the time and frequency location for each DL or UL SB of the set of DL and UL SBs in the SBFD operation associated with the SBFD mode, or (2) a second indication of the second set of time and frequency resources associated with the HD mode. For example, referring to FIG. 6, the gNB 604 may transmit an indication(s) 614, e.g., to the UE 602, that may include an indication for a SBFD mode at the UE 602 with a time and frequency location for each SB of the set of DL and UL SBs (e.g., RBs 714, DL SBs 760, and UL SBs 762 shown in FIGS. 7, 8, 9) in the SBFD operation (702, 750 of FIG. 7; 800 of FIG. 8; 900 of FIG. 9) associated with the SBFD mode, or may include an indication for a HD mode at the UE 602 with a set of time and frequency resources (e.g., DL band 706, 758 and UL band 710, 764 as shown in FIGS. 7, 8, 9). In some aspects, 1310 may be performed by the component 199.

Figure 14:
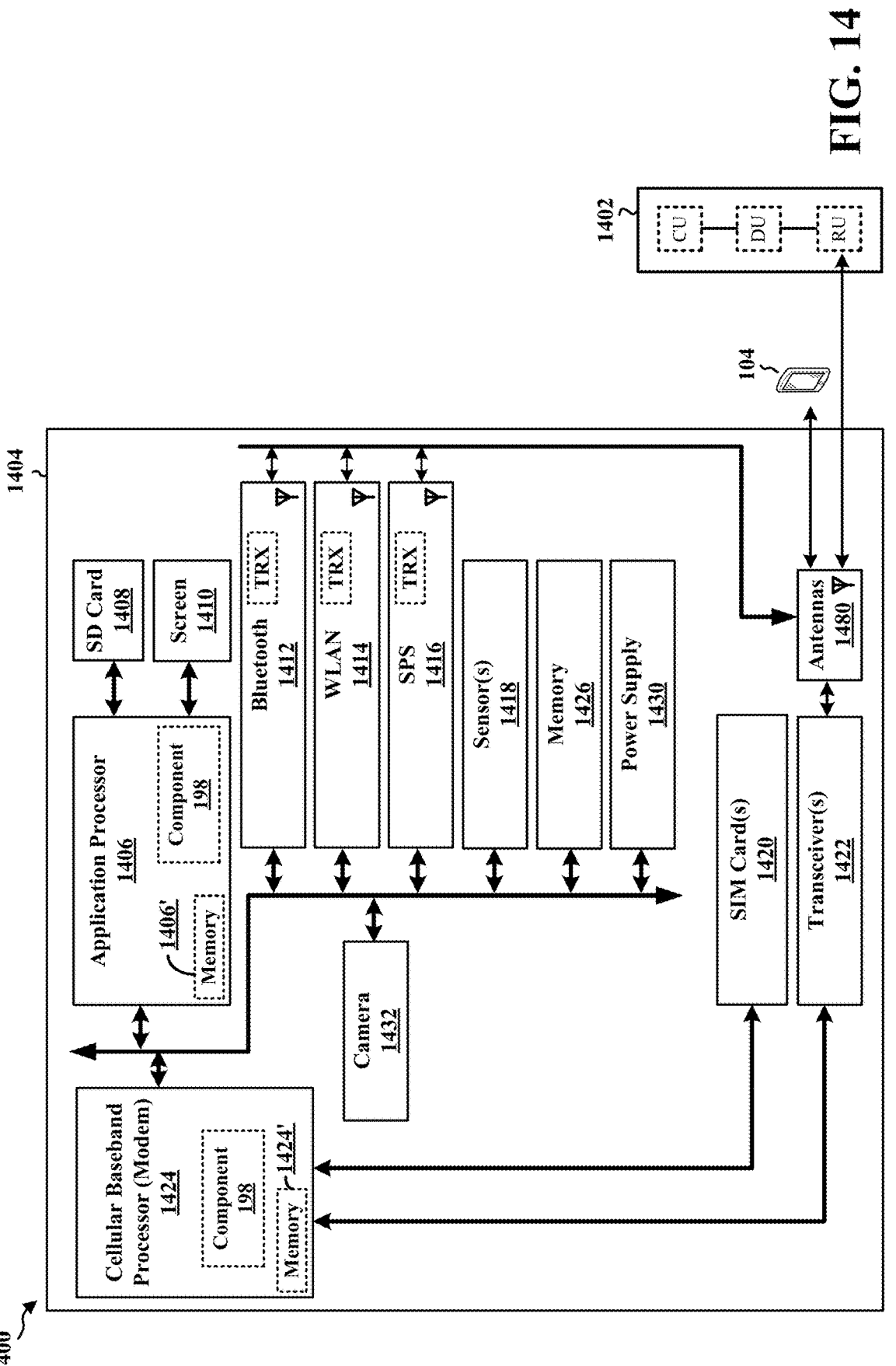
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the component 198 is configured to operate in at least one of a DL or UL SB full duplex (SBFD) mode associated with a SBFD operation or a HD mode, where the SBFD operation is associated with a first set of time and frequency resources and the HD mode is associated with a second set of time and frequency resources, and where the first set of time and frequency resources includes a set of DL and UL SBs. The component 198 is also configured to obtain at least one of (1) a first indication of a time and frequency location for each DL or UL SB of the set of DL and UL SBs in the SBFD operation associated with the SBFD mode, or (2) a second indication of the second set of time and frequency resources associated with the HD mode. The component 198 is further configured to switch to operate in another of the SBFD mode or the HD mode based on at least one of the first indication or the second indication. The component 198 may be configured to transmit, to a network node and prior to the at least one of the first indication or the second indication being obtained, an indication of the filter switching capability of the UE for at least one of: support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE. The component 198 may be configured to receive an indication of the scheduling offset via at least one of a radio resource control (RRC) message, a configuration information element (IE), DL control information (DCI) associated with scheduling data, or a medium access control (MAC)-control element (MAC-CE). The component 198 may be further configured to switch back to operate in the one of the SBFD mode or the HD mode subsequent to a length of time corresponding to the guard band, where the length of time is responsive to an end of the time period. The component 198 may be further configured to perform any of the aspects described in connection with FIGS. 11, 12, 13, 14, and/or performed by the UE in FIG. 6. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for operating in at least one of a DL or UL SBFD mode associated with a SBFD operation or a HD mode, where the SBFD operation is associated with a first set of time and frequency resources and the HD mode is associated with a second set of time and frequency resources, and where the first set of time and frequency resources includes a set of DL and UL SB s. The apparatus 1404, and in particular the cellular baseband processor 1424 and/or the application processor 1406, may also include means for obtaining at least one of (1) a first indication of a time and frequency location for each DL or UL SB of the set of DL and UL SBs in the SBFD operation associated with the SBFD mode, or (2) a second indication of the second set of time and frequency resources associated with the HD mode. The apparatus 1404, and in particular the cellular baseband processor 1424 and/or the application processor 1406, may also include means for switching to operate in another of the SBFD mode or the HD mode based on at least one of the first indication or the second indication. The application processor 1406 may include means for receiving an indication of the scheduling offset via at least one of a radio resource control (RRC) message, a configuration information element (IE), DL control information (DCI) associated with scheduling data, or a medium access control (MAC)-control element (MAC-CE). The application processor 1406 may further include means for switching back to operate in the one of the SBFD mode or the HD mode subsequent to a length of time corresponding to the guard band, where the length of time is responsive to an end of the time period. The application processor 1406 may further include means for transmitting, to a network node and prior to the at least one of the first indication or the second indication being obtained, an indication of the filter switching capability of the UE for at least one of: support of the UE for TDD, support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE. The application processor 1406 may further include means for performing any of the aspects described in connection with FIGS. 11, 12, 13, 14, and/or performed by the UE in FIG. 6. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to configure a time and frequency location for each of a first set of time and frequency resources in a SBFD operation associated with a SBFD mode and a second set of time and frequency resources associated with a HD mode, where the first set of time and frequency resources includes a set of DL and UL SBs. The component 199 is also configured to transmit, for a UE, at least one of (1) a first indication of the time and frequency location for each DL or UL SB of the set of DL and UL SBs in the SBFD operation associated with the SBFD mode, or (2) a second indication of the second set of time and frequency resources associated with the HD mode. In addition, component 199 may be configured to configure at least one of: a scheduling offset or a guard band, where the scheduling offset is associated with SP switching and AP switching, and where the guard band is associated with P switching or the AP switching, and where a filter switching capability of the UE is associated with at least one of: the scheduling offset for the SP switching, the guard band for the P switching, or the scheduling offset and the guard band for the AP switching. The component 199 may be further configured to transmit an indication of the scheduling offset via at least one of a radio resource control (RRC) message, a configuration information element (IE), DL control information (DCI) associated with scheduling data, or a medium access control (MAC)-control element (MAC-CE). The component 199 may be further configured to receive, from the UE and prior to the time and frequency location(s) being configured, an indication of the filter switching capability of the UE for at least one of: support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE. The component 199 may be further configured to perform any of the aspects described in connection with FIGS. 11, 12, 13, 14, and/or performed by the network entity (e.g., gNB) in FIG. 6. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for configuring a time and frequency location for each of a first set of time and frequency resources in a SBFD operation associated with a SBFD mode and a second set of time and frequency resources associated with a HD mode, where the first set of time and frequency resources includes a set of DL and UL SBs. The network entity 1502 may also include means for transmitting, for a UE, at least one of (1) a first indication of the time and frequency location for each DL or UL SB of the set of DL and UL SBs in the SBFD operation associated with the SBFD mode, or (2) a second indication of the second set of time and frequency resources associated with the HD mode. The network entity 1502 may include means for configuring at least one of: a scheduling offset or a guard band, where the scheduling offset is associated with SP switching and AP switching, and where the guard band is associated with P switching or the AP switching, and where a filter switching capability of the UE is associated with at least one of: the scheduling offset for the SP switching, the guard band for the P switching, or the scheduling offset and the guard band for the AP switching. The network entity 1502 may include means for transmitting an indication of the scheduling offset via at least one of a radio resource control (RRC) message, a configuration information element (IE), DL control information (DCI) associated with scheduling data, or a medium access control (MAC)-control element (MAC-CE). The network entity 1502 may include means for receiving, from the UE and prior to the time and frequency location(s) being configured, an indication of the filter switching capability of the UE for at least one of: support of the UE for SBFD operations, support of the UE for at least one of HD-to-SBFD mode transmitter or receiver filter switching, at least one of a type of the HD-to-SBFD mode transmitter or receiver filter switching of the UE, or a BWP switching delay of the UE, at least one of the first indication or the second indication is based on at least a portion of the indication of the filter switching capability of the UE. The network entity 1502 may include means for performing any of the aspects described in connection with FIGS. 11, 12, 13, 14, and/or performed by the network entity (e.g., gNB) in FIG. 6. The means may be the component 199 of the network entity 1502 configured to perform the functions recited by the means. As described supra, the network entity 1502 may include the TX processor 316, the RX processor 370, and the controller/ processor 375. As such, in one configuration, the means may be the TX processor 316, the RX processor 370, and/or the controller/processor 375 configured to perform the functions recited by the means.

Some aspects of wireless communications (e.g., 5G NR) may be designed to provide network side duplexing through base stations, gNBs, etc., but does not include provisions to enable a HD UE to utilize FD at a SB level. Relatedly, network-side FD suffers from self-interference, as well as clutter from signal reflection which impairs signals in communications. Thus, network-side FD is underutilized at both the network- and UE-sides of communications. The described aspects provide for a UE to switch operations between a SBFD mode or a HD mode through switching indications that include time and frequency location for SBs in SBFD operations or time and frequency resources associated with the HD mode, and that may include adjustable scheduling offsets, based on UE support for HD-to-SBFD filter switching. The indications may be utilized by the UE/network to allow FD operations at HD UEs for different periodicities, to enhance FD on the network side, and to reduce interference and increase duty cycles for signaling.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a user equipment (UE) or a wireless device, including a memory and at least one processor coupled to the memory and, based at least in part on information stored in the memory, the at least one processor is configured to: operate in at least one of a downlink (DL) or uplink (UL) subband (SB) full duplex (SBFD) mode associated with a SBFD operation or a half-duplex (HD) mode, where the SBFD operation is associated with a first set of time and frequency resources and the HD mode is associated with a second set of time and frequency resources, where the first set of time and frequency resources includes a set of DL and UL SBs; obtain at least one of (1) a first indication of a time and frequency location for each DL or UL SB of the set of DL and UL SBs in the SBFD operation associated with the SBFD mode, or (2) a second indication of the second set of time and frequency resources associated with the HD mode; and switch to operate in another of the SBFD mode or the HD mode based on at least one of the first indication or the second indication.

Aspect 2 is the apparatus of aspect 1, where each SB of the set of DL and UL SBs is configured as a resource block (RB) set within a corresponding bandwidth part (BWP) in a set of BWPs or a corresponding component carrier (CC) in a set of CCs.

Aspect 3 is the apparatus of any of aspects 1 and 2, where each SB of the set of DL and UL SBs is configured as the RB set based on a lack of support of the UE for HD-to-SBFD mode filter switching.

Aspect 4 is the apparatus of any of aspects 1 to 3, where each SB of the set of DL and UL SBs is configured as the RB set and is associated with an adjustable scheduling offset that is greater than or equal to a SBDF filter adaptation latency of the UE.

Aspect 5 is the apparatus of aspects 1 to 4, where each SB of the set of DL and UL SBs is configured as a corresponding BWP in a set of BWPs.

Aspect 6 is the apparatus of aspect 5, where the set of DL and UL SBs includes one or more DL SBs and at least one UL SB, and the set of BWPs includes one or more DL BWPs and an UL BWP, where each of the one or more DL SBs is configured as a corresponding DL BWP and the UL SB is configured as a corresponding UL BWP, and where the one or more DL BWPs are active at a single time instance and the UL BWP is active at the single time instance.

Aspect 7 is the apparatus of aspect 5, where the set of DL and UL SBs includes a DL SB and one or more UL SBs, and the set of BWPs includes a DL BWP and one or more UL BWPs, where the DL SB is configured as a corresponding DL BWP and each of the one or more UL SBs is configured as a corresponding UL BWP, and where the DL BWP is active at a single time instance and the one or more UL BWP are active at the single time instance.

Aspect 8 is the apparatus of aspect 7, where the one or more DL SBs include two non-contiguous DL SBs, where the two non-contiguous DL SBs are configured as a non-contiguous DL BWP, and where the non-contiguous DL BWP is active at the single time instance and the corresponding UL BWP is active at the single time instance.

Aspect 9 is the apparatus of aspect 5, where the set of DL and UL SBs includes one or more DL SBs and an UL SB, where the one or more DL SBs are configured as a corresponding DL BWP and the UL SB is configured as a corresponding UL BWP, and where the corresponding DL BWP and the corresponding UL BWP include a same center frequency.

Aspect 10 is the apparatus of aspect 5, where the set of DL and UL SBs includes a DL SB and one or more UL SBs, where the DL SB is configured as a corresponding DL BWP and the one or more UL SBs are configured as a corresponding UL BWP, and where the corresponding DL BWP and the corresponding UL BWP include a same center frequency.

Aspect 11 is the apparatus of aspect 10, where the one or more UL SBs include two non-contiguous UL SBs, where the two non-contiguous UL SBs are configured as a non-contiguous UL BWP, and where the non-contiguous UL BWP is active at a single time instance and the corresponding DL BWP is active at the single time instance.

Aspect 12 is the apparatus of any of aspects 5 to 11, where each SB of the set of DL and UL SBs is configured as the corresponding BWP in the set of BWPs if the UE supports HD-to-SBFD mode filter switching.

Aspect 13 is the apparatus of any of aspects 5 to 12, where each SB of the set of DL and UL SBs is configured as the corresponding BWP in the set of BWPs and is associated with an adjustable scheduling offset that is less than a BWP switching latency of the UE.

Aspect 14 is the apparatus of any of aspects 1 to 13, where the switch to operate in the another of the SBFD mode or the HD mode is associated with a filter switching capability of the UE, and where the filter switching capability corresponds to a latency of the switch to operate in the another of the SBFD mode or the HD mode.

Aspect 15 is the apparatus of aspect 14, where the latency of the switch is associated with at least one of: a scheduling offset or a guard band, where the scheduling offset is associated with semi-persistent (SP) switching and aperiodic (AP) switching, and where the guard band is associated with periodic (P) switching or the AP switching.

Aspect 16 is the apparatus of any of aspects 1 to 15, where the latency of the switch is associated with the scheduling offset, and the at least one processor is configured to: receive an indication of the scheduling offset via at least one of a radio resource control (RRC) message, a configuration information element (IE), DL control information (DCI) associated with scheduling data, or a medium access control (MAC)-control element (MAC-CE).

Aspect 17 is the apparatus of aspect 16, where the scheduling offset is based on signaling and includes a number of symbols having a subcarrier spacing (SCS) associated with the signaling or a duration of time, where the signaling includes at least one of: the DCI associated with the scheduling data, a first acknowledgement (ACK) of the DCI associated with the scheduling data, a UL transmission associated with the DCI associated with the scheduling data, or a second ACK of other DCI not associated with the scheduling data.

Aspect 18 is the apparatus of aspect 15, where the latency of the switch is associated with the scheduling offset and the guard band for the AP switching, and where a time period of the SBFD mode or the HD mode for the AP switching includes at least one of a number of symbols or a duration of time.

Aspect 19 is the apparatus of aspect 18, where the at least one processor is further configured to: switch back to operate in the one of the SBFD mode or the HD mode subsequent to a length of time corresponding to the guard band, where the length of time is responsive to an end of the time period.

Aspect 20 is the apparatus of any of aspects 1 to 19, where the at least one processor is further configured to: transmit, to a network node and prior to the at least one of the first indication or the second indication being obtained, an indication of the filter switching capability of the UE for at least one of: support of the UE for SBFD operations, support of the UE for at least one of HD-to-SBFD mode transmitter or receiver filter switching, at least one of a type of the HD-to-SBFD mode transmitter or receiver filter switching of the UE, or a bandwidth part (BWP) switching delay of the UE, and where at least one of the first indication or the second indication is based on at least a portion of the indication of the filter switching capability of the UE.

Aspect 21 is the apparatus of any of aspects 1 to 20, where the apparatus further includes at least one transceiver coupled to the at least one processor, and where to obtain at least one of the first indication or the second indication, the at least one processor is configured to: receive, from a network node, at least one of the first indication or the second indication via the at least one transceiver.

Aspect 22 is the apparatus of any of aspects 1 to 13 and 21, where one of the first indication or the second indication is obtained, and where the switch to operate in the another of the SBFD mode or the HD mode is based on at least one of a switch in time or a switch in frequency associated with a semi-static switching pattern.

Aspect 23 is an apparatus for wireless communication at a network node, including a memory and at least one processor coupled to the memory and, based at least in part on information stored in the memory, the at least one processor is configured to: configure a time and frequency location for each of a first set of time and frequency resources in a subband (SB) full duplex (SBFD) operation associated with a SBFD mode and a second set of time and frequency resources associated with a half-duplex (HD) mode, where the first set of time and frequency resources includes a set of downlink (DL) and uplink (UL) SBs, and to transmit, for a user equipment (UE), at least one of (1) a first indication of the time and frequency location for each DL or UL SB of the set of DL and UL SBs in the SBFD operation associated with the SBFD mode, or (2) a second indication of the second set of time and frequency resources associated with the HD mode.

Aspect 24 is the apparatus of aspect 23, where each SB of the set of DL and UL SBs is configured as a resource block (RB) set within a corresponding bandwidth part (BWP) in a set of BWPs or a corresponding component carrier (CC) in a set of CCs; or where each SB of the set of DL and UL SBs is configured as a corresponding BWP in the set of BWPs.

Aspect 25 is the apparatus of aspects 23 and 24, where each SB of the set of DL and UL SBs is configured as a corresponding BWP in the set of BWPs; and: where the set of DL and UL SBs includes one or more DL SBs and at least one UL SB, and the set of BWPs includes one or more DL BWPs and an UL BWP, where each of the one or more DL SBs is configured as the corresponding DL BWP and the UL SB is configured as the corresponding UL BWP, and where the one or more DL BWPs are active at the single time instance and the UL BWP is active at the single time instance; where the set of DL and UL SBs includes a DL SB and one or more UL SBs, and the set of BWPs includes a DL BWP and one or more UL BWPs, where the DL SB is configured as the corresponding DL BWP and each of the one or more UL SBs is configured as the corresponding UL BWP, and where the DL BWP is active at the single time instance and the one or more UL BWP are active at the single time instance; where the set of DL and UL SBs includes one or more DL SBs and an UL SB, where the one or more DL SBs are configured as a corresponding DL BWP and the UL SB is configured as a corresponding UL BWP, and where the corresponding DL BWP and the corresponding UL BWP include a same center frequency; or where the set of DL and UL SBs includes a DL SB and one or more UL SBs, where the DL SB is configured as a corresponding DL BWP and the one or more UL SBs are configured as a corresponding UL BWP, and where the corresponding DL BWP and the corresponding UL BWP include the same center frequency.

Aspect 26 is the apparatus of aspect 25, where the one or more DL SBs include two non-contiguous DL SBs, where the two non-contiguous DL SBs are configured as a non-contiguous DL BWP, and where the non-contiguous DL BWP is active at the single time instance and the corresponding UL BWP is active at the single time instance; or where the one or more UL SBs include two non-contiguous UL SBs, where the two non-contiguous UL SBs are configured as a non-contiguous UL BWP, and where the non-contiguous UL BWP is active at the single time instance and the corresponding DL BWP is active at the single time instance.

Aspect 27 is the apparatus of aspects 23 and 24, where each SB of the set of DL and UL SBs is configured as a resource block (RB) set for at least one of: a UE-dedicated configuration, or a cell-common configuration.

Aspect 28 is the apparatus of any of aspects 23 to 27, where the at least one processor is further configured to: configure at least one of: a scheduling offset or a guard band, where the scheduling offset is associated with semi-persistent (SP) switching and aperiodic (AP) switching, and where the guard band is associated with periodic (P) switching or the AP switching; where a filter switching capability of the UE is associated with at least one of: the scheduling offset for the SP switching, the guard band for the P switching, or the scheduling offset and the guard band for the AP switching.

Aspect 29 is the apparatus of any of aspects 23 to 28, where the apparatus is a wireless communication device, further including at least one of an antenna or a transceiver coupled to the at least one processor, where to transmit at least one of the first indication or the second indication, the at least one processor is configured to: transmit, for the UE, at least one of the first indication or the second indication via the at least one transceiver.

Aspect 30 is a method of wireless communication for implementing any of aspects 1 to 29.

Aspect 31 is an apparatus for wireless communication including means for implementing any of aspects 1 to 29.

Aspect 32 is a computer-readable medium (e.g., a non-transitory computer-readable medium) storing computer executable code, the code when executed by at least one processor causes the at least one processor to implement any of aspects 1 to 29.

What is claimed is:

1. An apparatus for wireless communication at a user equipment (UE), comprising:

memory; and at least one processor coupled to the memory and, based at least in part on information stored in the memory, the at least one processor is configured to:

operate in at least one of a downlink (DL) or uplink (UL) subband (SB) full duplex (SBFD) mode associated with a SBFD operation or a half-duplex (HD) mode, wherein the SBFD operation is associated with a first set of time and frequency resources and the HD mode is associated with a second set of time and frequency resources, wherein the first set of time and frequency resources includes a set of DL and UL SBs;

obtain at least one of (1) a first indication of a time and frequency location for each DL or UL SB of the set of DL and UL SBs in the SBFD operation associated with the SBFD mode, or (2) a second indication of the second set of time and frequency resources associated with the HD mode; and switch to operate in another of the SBFD mode or the HD mode based on at least one of the first indication or the second indication.

2. The apparatus of claim 1, wherein each SB of the set of DL and UL SBs is configured as a resource block (RB) set within a corresponding bandwidth part (BWP) in a set of BWPs or a corresponding component carrier (CC) in a set of CCs.

3. The apparatus of claim 2, wherein the each SB of the set of DL and UL SBs is configured as the RB set based on a lack of support of the UE for HD-to-SBFD mode filter switching.

4. The apparatus of claim 2, wherein the each SB of the set of DL and UL SBs is configured as the RB set and is associated with an adjustable scheduling offset that is greater than or equal to a SBDF filter adaptation latency of the UE.

5. The apparatus of claim 1, wherein each SB of the set of DL and UL SBs is configured as a corresponding BWP in a set of BWPs.

6. The apparatus of claim 5, wherein the set of DL and UL SBs includes one or more DL SBs and at least one UL SB, and the set of BWPs includes one or more DL BWPs and an UL BWP, wherein each of the one or more DL SBs is configured as a corresponding DL BWP and the UL SB is configured as a corresponding UL BWP, and wherein the one or more DL BWPs are active at a single time instance and the UL BWP is active at the single time instance.

7. The apparatus of claim 5, wherein the set of DL and UL SBs includes a DL SB and one or more UL SBs, and the set of BWPs includes a DL BWP and one or more UL BWPs, wherein the DL SB is configured as a corresponding DL BWP and each of the one or more UL SBs is configured as a corresponding UL BWP, and wherein the DL BWP is active at a single time instance and the one or more UL BWP are active at the single time instance.

8. The apparatus of claim 7, wherein the one or more DL SBs include two non-contiguous DL SBs, wherein the two non-contiguous DL SBs are configured as a non-contiguous DL BWP, wherein the non-contiguous DL BWP is active at the single time instance and the corresponding UL BWP is active at the single time instance.

9. The apparatus of claim 5, wherein the set of DL and UL SBs includes one or more DL SBs and an UL SB, wherein the one or more DL SBs are configured as a corresponding DL BWP and the UL SB is configured as a corresponding UL BWP, wherein the corresponding DL BWP and the corresponding UL BWP include a same center frequency.

10. The apparatus of claim 5, wherein the set of DL and UL SBs includes a DL SB and one or more UL SBs, wherein the DL SB is configured as a corresponding DL BWP and the one or more UL SBs are configured as a corresponding UL BWP, wherein the corresponding DL BWP and the corresponding UL BWP include a same center frequency.

11. The apparatus of claim 10, wherein the one or more UL SBs include two non-contiguous UL SBs, wherein the two non-contiguous UL SBs are configured as a non-contiguous UL BWP, wherein the non-contiguous UL BWP is active at a single time instance and the corresponding DL BWP is active at the single time instance.

12. The apparatus of claim 5, wherein the each SB of the set of DL and UL SBs is configured as the corresponding BWP in the set of BWPs if the UE supports HD-to-SBFD mode filter switching.

13. The apparatus of claim 5, wherein the each SB of the set of DL and UL SBs is configured as the corresponding BWP in the set of BWPs and is associated with an adjustable scheduling offset that is less than a BWP switching latency of the UE.

14. The apparatus of claim 1, wherein the switch to operate in the another of the SBFD mode or the HD mode is associated with a filter switching capability of the UE, and wherein the filter switching capability corresponds to a latency of the switch to operate in the another of the SBFD mode or the HD mode.

15. The apparatus of claim 14, wherein the latency of the switch is associated with at least one of: a scheduling offset or a guard band, wherein the scheduling offset is associated with semi-persistent (SP) switching and aperiodic (AP) switching, and wherein the guard band is associated with periodic (P) switching or the AP switching.

16. The apparatus of claim 15, wherein the latency of the switch is associated with the scheduling offset, and wherein the at least one processor is further configured to:
receive an indication of the scheduling offset via at least one of a radio resource control (RRC) message, a configuration information element (IE), DL control information (DCI) associated with scheduling data, or a medium access control (MAC)-control element (MAC-CE).

17. The apparatus of claim 16, wherein the scheduling offset is based on signaling and comprises a number of symbols having a subcarrier spacing (SCS) associated with the signaling or a duration of time, wherein the signaling includes at least one of:
the DCI associated with the scheduling data,
a first acknowledgement (ACK) of the DCI associated with the scheduling data,
a UL transmission associated with the DCI associated with the scheduling data, or
a second ACK of other DCI not associated with the scheduling data.

18. The apparatus of claim 15, wherein the latency of the switch is associated with the scheduling offset and the guard band for the AP switching; and
wherein a time period of the SBFD mode or the HD mode for the AP switching comprises at least one of a number of symbols or a duration of time.

19. The apparatus of claim 18, wherein the at least one processor is further configured to:
switch back to operate in the one of the SBFD mode or the HD mode subsequent to a length of time corresponding to the guard band, wherein the length of time is responsive to an end of the time period.

20. The apparatus of claim 14, wherein the at least one processor is further configured to:
transmit, to a network node and prior to the at least one of the first indication or the second indication being obtained, an indication of the filter switching capability of the UE for at least one of:
support of the UE for SBFD operations;
support of the UE for at least one of HD-to-SBFD mode transmitter or receiver filter switching;
at least one of a type of the HD-to-SBFD mode transmitter or receiver filter switching of the UE; or
a bandwidth part (BWP) switching delay of the UE; and
wherein at least one of the first indication or the second indication is based on at least a portion of the indication of the filter switching capability of the UE.

21. The apparatus of claim 1, further comprising at least one transceiver coupled to the at least one processor, wherein to obtain at least one of the first indication or the second indication, the at least one processor is configured to:
receive, from a network node, at least one of the first indication or the second indication via the at least one transceiver.

22. The apparatus of claim 1, wherein one of the first indication or the second indication is obtained, wherein the switch to operate in the another of the SBFD mode or the HD mode is based on at least one of a switch in time or a switch in frequency associated with a semi-static switching pattern.

23. An apparatus for wireless communication at a network node, comprising:
memory; and
at least one processor coupled to the memory and, based at least in part on information stored in the memory, the at least one processor is configured to:
configure a time and frequency location for each of a first set of time and frequency resources in a subband (SB) full duplex (SBFD) operation associated with a SBFD mode and a second set of time and frequency resources associated with a half-duplex (HD) mode, wherein the first set of time and frequency resources includes a set of downlink (DL) and uplink (UL) SBs; and
transmit, for a user equipment (UE), at least one of (1) a first indication of the time and frequency location for each DL or UL SB of the set of DL and UL SBs in the SBFD operation associated with the SBFD mode, or (2) a second indication of the second set of time and frequency resources associated with the HD mode.

24. The apparatus of claim 23, wherein each SB of the set of DL and UL SBs is configured as a resource block (RB) set within a corresponding bandwidth part (BWP) in a set of BWPs or a corresponding component carrier (CC) in a set of CCs; or wherein each SB of the set of DL and UL SBs is configured as a corresponding BWP in the set of BWPs.

25. The apparatus of claim 24, wherein each SB of the set of DL and UL SBs is configured as a corresponding BWP in the set of BWPs; and wherein the set of DL and UL SBs includes one or more DL SBs and at least one UL SB, and the set of BWPs includes one or more DL BWPs and an UL BWP, wherein each of the one or more DL SBs is configured as the corresponding DL BWP and the UL SB is configured as the corresponding UL BWP, and wherein the one or more DL BWPs are active at a single time instance and the UL BWP is active at the single time instance, wherein the set of DL and UL SBs includes a DL SB and one or more UL SBs, and the set of BWPs includes a DL BWP and one or more UL BWPs, wherein the DL SB is configured as the corresponding DL BWP and each of the one or more UL SBs is configured as the corresponding UL BWP, and wherein the DL BWP is active at the single time instance and the one or more UL BWP are active at the single time instance, wherein the set of DL and UL SBs includes one or more DL SBs and an UL SB, wherein the one or more DL SBs are configured as a corresponding DL BWP and the UL SB is configured as a corresponding UL BWP, wherein the corresponding DL BWP and the corresponding UL BWP include a same center frequency, or wherein the set of DL and UL SBs includes a DL SB and one or more UL SBs, wherein the DL SB is configured as a corresponding DL BWP and the one or more UL SBs are configured as a corresponding UL BWP, wherein the corresponding DL BWP and the corresponding UL BWP include the same center frequency.

26. The apparatus of claim 25, wherein the one or more DL SBs include two non-contiguous DL SBs, wherein the two non-contiguous DL SBs are configured as a non-contiguous DL BWP, wherein the non-contiguous DL BWP is active at the single time instance and the corresponding UL BWP is active at the single time instance; or wherein the one or more UL SBs include two non-contiguous UL SBs, wherein the two non-contiguous UL SBs are configured as a non-contiguous UL BWP, wherein the non-contiguous UL BWP is active at the single time instance and the corresponding DL BWP is active at the single time instance.

27. The apparatus of claim 23, wherein each SB of the set of DL and UL SBs is configured as a resource block (RB) set for at least one of:

a UE-dedicated configuration, or a cell-common configuration.

28. The apparatus of claim 23, wherein the at least one processor is further configured to:

configure at least one of: a scheduling offset or a guard band, wherein the scheduling offset is associated with semi-persistent (SP) switching and aperiodic (AP) switching, and wherein the guard band is associated with periodic (P) switching or the AP switching; and wherein a filter switching capability of the UE is associated with at least one of: the scheduling offset for the SP switching, the guard band for the P switching, or the scheduling offset and the guard band for the AP switching.

29. A method of wireless communication at a user equipment (UE), comprising:

operating in at least one of a downlink (DL) or uplink (UL) subband (SB) full duplex (SBFD) mode associated with a SBFD operation or a half-duplex (HD) mode, wherein the SBFD operation is associated with a first set of time and frequency resources and the HD mode is associated with a second set of time and frequency resources, wherein the first set of time and frequency resources includes a set of DL and UL SBs;

obtaining at least one of (1) a first indication of a time and frequency location for each DL or UL SB of the set of DL and UL SBs in the SBFD operation associated with the SBFD mode, or (2) a second indication of the second set of time and frequency resources associated with the HD mode; and switching to operate in another of the SBFD mode or the HD mode based on at least one of the first indication or the second indication.

30. A method of wireless communication at a network node, comprising:

configuring a time and frequency location for each of a first set of time and frequency resources in a subband (SB) full duplex (SBFD) operation associated with a SBFD mode and a second set of time and frequency resources associated with a half-duplex (HD) mode, wherein the first set of time and frequency resources includes a set of downlink (DL) and uplink (UL) SBs; and transmitting, for a user equipment (UE), at least one of (1) a first indication of the time and frequency location for each DL or UL SB of the set of DL and UL SBs in the SBFD operation associated with the SBFD mode, or (2) a second indication of the second set of time and frequency resources associated with the HD mode.

* * * * *